(12) United States Patent
Kim et al.

(10) Patent No.: US 10,559,062 B2
(45) Date of Patent: Feb. 11, 2020

(54) METHOD FOR AUTOMATIC FACIAL IMPRESSION TRANSFORMATION, RECORDING MEDIUM AND DEVICE FOR PERFORMING THE METHOD

(71) Applicant: Korea Institute of Science and Technology, Seoul (KR)

(72) Inventors: Ig Jae Kim, Seoul (KR); Heeseung Choi, Seoul (KR); Sungyeon Park, Seoul (KR); Junghyun Cho, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 15/985,173

(22) Filed: May 21, 2018

(65) Prior Publication Data

US 2018/0268207 A1 Sep. 20, 2018

Related U.S. Application Data

(63) Continuation-in-part of application No. 15/069,095, filed on Mar. 14, 2016, now Pat. No. 9,978,119.

(30) Foreign Application Priority Data

Oct. 22, 2015 (KR) ........................ 10-2015-0147405

(51) Int. Cl.
*G06T 3/00* (2006.01)
*G06K 9/00* (2006.01)
(Continued)

(52) U.S. Cl.
CPC ........ *G06T 3/0093* (2013.01); *G06K 9/00281* (2013.01); *G06K 9/00302* (2013.01);
(Continued)

(58) Field of Classification Search
CPC ............ G06K 9/00281; G06K 9/00302; G06T 15/00; G06T 11/00; G06T 3/0093
See application file for complete search history.

(56) References Cited

U.S. PATENT DOCUMENTS 9,104,908 B1 8/2015 Rogers et al.
2002/0057273 A1 5/2002 Iwata et al.
(Continued)

FOREIGN PATENT DOCUMENTS

| KR | 10-0764130 B1 | 10/2007 |
|---|---|---|
| KR | 10-1444816 B1 | 9/2014 |
| KR | 10-1484003 B1 | 1/2015 |

OTHER PUBLICATIONS

Leyvand, Tommer, et al. "Data-driven enhancement of facial attractiveness." ACM Transactions on Graphics (2008) (9 pages in English).

*Primary Examiner* — Michelle L Sams
(74) *Attorney, Agent, or Firm* — NSIP Law

(57) ABSTRACT

A method for automatic facial impression transformation includes extracting landmark points for elements of a target face whose facial impression is to be transformed as well as distance vectors respectively representing distances of the landmark points, comparing the distance vectors to select a learning data set similar to the target face from a database, extracting landmark points and distance vectors from the learning data set, transforming a local feature of the target face based on the landmark points of the learning data set and score data for a facial impression, and transforming a global feature of the target face based on the distance vectors of the learning data set and the score data for the facial impression. Accordingly, a facial impression may be transformed in various ways while keeping an identity of a corresponding person.

12 Claims, 24 Drawing Sheets

(51) Int. Cl.
G06K 9/62 (2006.01)
G06T 13/40 (2011.01)
G06T 7/269 (2017.01)

(52) U.S. Cl.
CPC ......... *G06K 9/00315* (2013.01); *G06K 9/621* (2013.01); *G06T 7/269* (2017.01); *G06T 13/40* (2013.01); *G06T 2207/20081* (2013.01); *G06T 2207/30201* (2013.01)

(56) References Cited

U.S. PATENT DOCUMENTS

| | | |
|---|---|---|
| 2012/0139830 A1 | 6/2012 | Hwang et al. |
| 2015/0046375 A1 | 2/2015 | Mandel et al. |

<LOCAL FEATURE TRANSFORMATION>

BEFORE TRANSFORMATION → AFTER TRANSFORMATION

<GLOBAL FEATURE TRANSFORMATION>

BEFORE TRANSFORMATION → AFTER TRANSFORMATION

COMPARISON TARGET FACIAL IMAGE (910)

SECOND DISTANCE VECTOR (1020)

METHOD FOR AUTOMATIC FACIAL IMPRESSION TRANSFORMATION, RECORDING MEDIUM AND DEVICE FOR PERFORMING THE METHOD

CROSS-REFERENCE TO RELATED APPLICATIONS

This application is a continuation-in-part of U.S. patent application Ser. No. 15/069,095 filed on Mar. 14, 2016, now U.S. Pat. No. 9,978,119 B2 issued on May 22, 2018, which claims the benefit under 35 U.S.C. 119(a) and 365(b) of Korean Patent Application No. 10-2015-0147405, filed on Oct. 22, 2015, in the Korean Intellectual Property Office.

BACKGROUND

1. Field

The present disclosure relates to a method for automatic facial impression transformation, and a recording medium and device for performing the method, and more particularly, to a method for automatic facial impression transformation, which changes a target face model into a desired facial impression for the purpose of a video conference, and a recording medium and device for performing the method.

2. Description of the Related Art

Along with the development of technologies, many persons are capable of communicating with other persons anytime and at any place by using digital instruments such as smart phones. By using a video conference technique of digital instruments, persons are able to communicate with each other while looking in the face as if facing each other even though they are far away from each other.

During a video conference, a person will want to show a certain facial impression to opponents. In addition, at a situation such as an interview for a job, a person would like to show a more reliable image. In this case, a technique for changing a facial image into a facial impression desired by a user to hold a video conference with the desired facial impression is demanded.

However, in an existing facial impression transforming method, an input facial image is transformed into a facial impression using an engine learned with the same data, and thus all faces tend to change into a similar way (for example, enlarging the size of eyes). In addition, the existing technique is not capable of classifying facial images into several classes in advance, selecting a class similar to an input facial image to configure a learning data set, and then configuring a customized learning data set for the input facial image.

SUMMARY

The present disclosure is directed to providing a method for automatic facial impression transformation, which may change a target face model into a desired facial impression.

The present disclosure is also directed to providing a recording medium on which a computer program for performing the method for automatic facial impression transformation is recorded.

The present disclosure is also directed to providing a device for performing the method for automatic facial impression transformation.

In one aspect, there is provided a method for automatic facial impression transformation, including: extracting landmark points for elements of a target face whose facial impression is to be transformed as well as distance vectors respectively representing distances of the landmark points; comparing the distance vectors to select a learning data set similar to the target face from a database; extracting landmark points and distance vectors from the learning data set; transforming a local feature of the target face based on the landmark points of the learning data set and score data for a facial impression; and transforming a global feature of the target face based on the distance vectors of the learning data set and the score data for the facial impression.

In an embodiment of the present disclosure, in the comparing of the distance vectors to select a learning data set similar to the target face from a database, an n (here, n is a natural number) number of learning data set may be selected in order from a learning data most similar to the target face.

In an embodiment of the present disclosure, the transforming of a local feature of the target face based on the landmark points of the learning data set may include: generating a target function based on the landmark points of the learning data set and score data of a facial impression; and determining shapes and sizes of the elements of the target face based on the target function.

In an embodiment of the present disclosure, the transforming of a global feature of the target face based on the distance vectors of the learning data set may include: generating a target function based on the distance vectors of the learning data set and score data of a facial impression; and determining locations and angles of the elements of the target face based on the target function.

In an embodiment of the present disclosure, the determining of locations and angles of the elements of the target face based on the target function may include: extracting a modified distance vector based on the target function; extracting a modified distance vector for a specific facial impression by means of an optimization technique; extracting a modified distance vector by setting a distance vector of the target face as an initial value at the target function; modifying landmark points to decrease an error of distance between the modified distance vector and the landmark points corresponding to the modified distance vector; and moving locations of the face elements transformed based on the modified landmark points.

In an embodiment of the present disclosure, the method for automatic facial impression transformation may further include outputting an image transformed in real time with respect to a moving target face.

In an embodiment of the present disclosure, the outputting of an image transformed in real time with respect to a moving target face may include: arranging angles and locations of the landmark points of the transformed target face to landmark points of an initial face before transformation; extracting landmark points of the face in real time for each frame with respect to a moving facial image; extracting an angle difference between the landmark points extracted in real time and the landmark points of the initial face; adding the angle difference to the landmark points of the transformed target face; and warping the target face based on the landmark points modified in real time and outputting the warped face.

In an embodiment of the present disclosure, the method for automatic facial impression transformation may further include acquiring a target face whose facial impression is to be transformed.

In an embodiment of the present disclosure, the target face may be an expressionless photograph staring at front.

In an embodiment of the present disclosure, the forming of a database storing learning data may include: acquiring expressionless front facial images; and extracting landmark points and distance vectors from the expressionless front facial images.

In an embodiment of the present disclosure, the forming of a database storing learning data may include: acquiring expressionless front facial images; and extracting landmark points and distance vectors from the expressionless front facial images.

In an embodiment of the present disclosure, the forming of a database storing learning data may include: collecting and accumulating score data for facial impressions.

In another aspect of the present disclosure, there is provided a computer-readable recording medium, on which a computer program for executing the method for automatic facial impression transformation is recorded.

In another aspect of the present disclosure, there is provided a device for automatic facial impression transformation, including: a facial feature extracting unit configured to extract landmark points for elements of a target face whose facial impression is to be transformed as well as distance vectors respectively representing distances of the landmark points; a facial impression transforming unit configured to compare the distance vectors, select an n (here, n is a natural number) number of learning data set in order from a learning data most similar to the target face, extract landmark points and distance vectors from the learning data set, and transform a facial impression of the target face based on the extracted landmark points and distance vectors of the learning data set; and a moving picture tracing unit configured to output a transformed image in real time with respect to a moving target face.

In an embodiment of the present disclosure, the facial impression transforming unit may include a local feature transforming unit configured to generate a target function based on the landmark points of the learning data set and score data of a facial impression and determine shapes and sizes of the elements of the target face based on the target function.

In an embodiment of the present disclosure, the facial impression transforming unit may include a global feature transforming unit configured to generate a target function based on the distance vectors of the learning data set and score data of a facial impression and determine locations and angles of the elements of the target face based on the target function.

In an embodiment of the present disclosure, the device for automatic facial impression transformation may further include an image acquiring unit configured to acquire a target face whose facial impression is to be transformed.

In an embodiment of the present disclosure, the device for automatic facial impression transformation may further include a database constructing unit configured to store expressionless front facial images as well as landmark points and distance vectors extracted from the expressionless front facial images.

In another embodiment of the present disclosure, there is provided a method for automatic facial impression transformation, including: extracting landmark points for elements of a target face whose facial impression is to be transformed as well as distance vectors respectively representing distances of the landmark points; acquiring, from a database, a learning data set associated with a facial shape similar to the target face based on the distance vectors; extracting landmark points and distance vectors from the learning data set; determining a first distance vector of the target face used for transforming a local feature of the target face based on distance vectors between landmark points determining sizes and shapes of face elements of the learning data set, and determining a second distance vector of the target face used for transforming a global feature of the target face based on distance vectors between landmark points determining arrangement of the face elements of the learning data set; and transforming the facial impression of the target face based on at least one of the first distance vector and the second distance vector.

In an embodiment of the present disclosure, the learning data set used may be the same for the transforming of the local feature of the target face and the transforming of the global feature of the target face.

In an embodiment of the present disclosure, the transforming of the facial impression of the target face may include: generating a target function based on the landmark points of the learning data set and score data of a facial impression; and determining shapes and sizes of the elements of the target face by moving landmark points associated with the first distance vector, based on the target function.

In an embodiment of the present disclosure, the transforming of the facial impression of the target face may include: generating a target function based on the distance vectors of the learning data set and score data of a facial impression; and determining locations and angles of the elements of the target face by moving landmark points associated with the second distance vector, based on the target function.

In an embodiment of the present disclosure, the method may further include receiving a user input of selecting a target facial impression type among a plurality of facial impression types, wherein the acquiring of the learning data set from the database may include acquiring a learning data set associated with the target facial impression type.

In an embodiment of the present disclosure, the method may further include continuously outputting frames of the moving picture including the target face whose facial impression is transformed.

In an embodiment of the present disclosure, the method may further include acquiring a target face whose facial impression is to be transformed from a frame of a moving picture.

In an embodiment of the present disclosure, the target face may be an expressionless photograph staring at front.

In an embodiment of the present disclosure, the method may further include forming a database storing learning data.

In an embodiment of the present disclosure, the forming of the database storing the learning data may include: acquiring expressionless front facial images; and extracting landmark points and distance vectors from the expressionless front facial images.

In an embodiment of the present disclosure, the forming of the database storing the learning data may include collecting and accumulating score data for facial impressions.

In another embodiment of the present disclosure, there is provided a non-transitory computer-readable recording medium, on which a computer program for executing the method for automatic facial impression transformation.

In another embodiment of the present disclosure, there is provided a device for automatic facial impression transformation, including: a facial feature extracting unit configured to extract landmark points for elements of a target face whose facial impression is to be transformed, included in a frame of a moving picture, as well as distance vectors respectively representing distances of the landmark points; and a facial impression transforming unit configured to acquire, from a database, a learning data set associated with a facial shape most similar to the target face based on the distance vectors, extract landmark points and distance vectors from the learning data set, and transform the facial impression of the target face based on the extracted landmark points and distance vectors of the learning data set, wherein the facial impression transforming unit includes: a local feature transforming unit configured to determine a first distance vector of the target face used for transforming a local feature of the target face, based on distance vectors between landmark points determining sizes and shapes of face elements of the learning data set; and a global feature transforming unit configured to determine a second distance vector of the target face used for transforming a global feature of the target face, based on distance vectors between landmark points determining arrangement of face elements of the learning data set, and the facial impression of the target face is transformed based on at least one of the first distance vector and the second distance vector.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

The following detailed description of the present disclosure refers to the accompanying drawings which show specific embodiments implemented by the present disclosure. These embodiments are described in detail so as to be easily implemented by those skilled in the art. It should be understood that various embodiments of the present disclosure are different from each other but not exclusive from each other. For example, specific shapes, structures and features written herein can be implemented in other embodiments without departing from the scope of the present disclosure. In addition, it should be understood that locations or arrangements of individual components in each embodiment may be changed without departing from the scope of the present disclosure. Therefore, the following detailed description is not directed to limiting the present disclosure.

Hereinafter, embodiments of the present disclosure will be described in detail with reference to the accompanying drawings.

Figure 1:
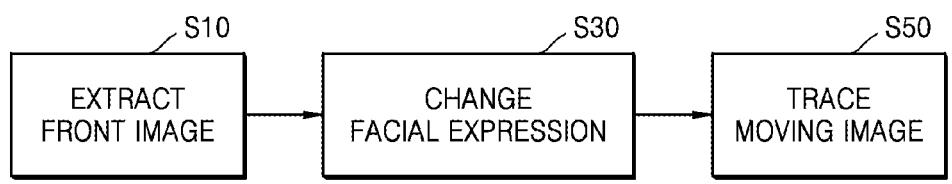
FIG. 1 is a flowchart for illustrating a method for automatic facial impression transformation according to an embodiment of the present disclosure.
Figure 2:
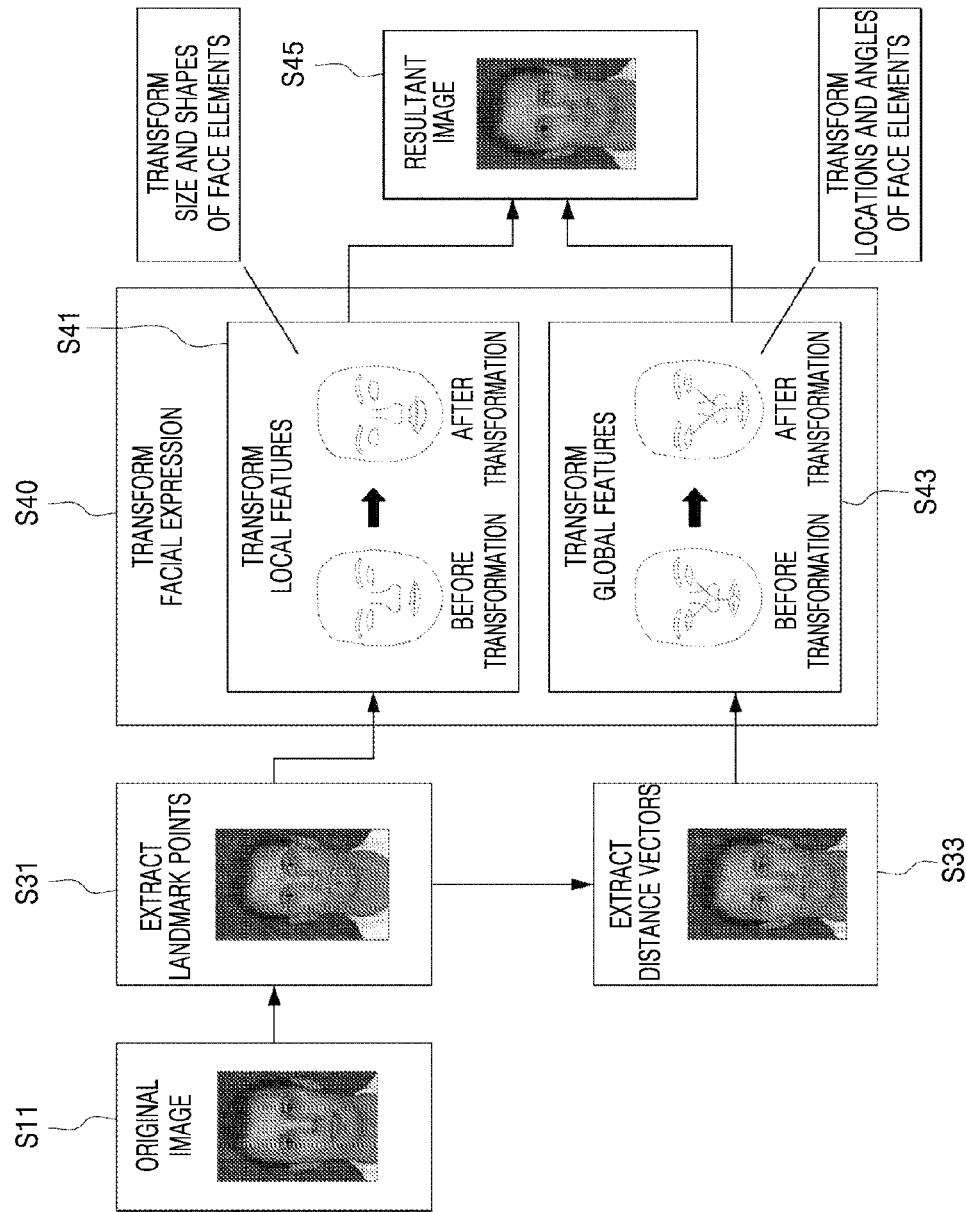
FIG. 2 is a diagram showing the flow of the method for automatic facial impression transformation, depicted in FIG. 1.

FIG. 1 is a flowchart for illustrating a method for automatic facial impression transformation according to an embodiment of the present disclosure. FIG. 2 is a diagram showing the flow of the method for automatic facial impression transformation, depicted in FIG. 1.

The present disclosure is directed to a method for automatic facial impression transformation based on a moving picture, and when a facial impression is transformed, a learning data set is configured suitable for a facial shape of an input target face to generate an estimation function of the corresponding facial impression, so that face components (shape and location) are transformed to have a high resultant value of the function, thereby transforming the facial image into a facial impression desired by the user.

In addition, the transformation process is performed at two stages, namely a local transformation for determining size and shape of local elements (eyes, eyebrows, nose and mouth) of the face and a global transformation for determining locations of local elements of the face. Further, it is possible to detect a facial landmark point in real time and consider a movement of an object, which allows application to a moving picture.

Referring to FIG. 1, the present disclosure provides a method for extracting a front image (S10), automatically changing a target face model into a desired facial impression by using data (S30), and then replacing the target face with a transformed face in real time in a moving picture (S50).

Though not shown in FIG. 1, the method for automatic facial impression transformation according to the present disclosure may have a learning process for facial impression transformation.

For learning, first, expressionless front image data are acquired, and then each data is evaluated into scores (for example, 1 to 7 points) depending on the degree of facial impression to be transformed. In an embodiment, a user may input a score for a facial impression, for example "baby-faced", "matured", "sharp", "gentle" or the like, and the score of the facial impression may be automatically calculated according to the input score.

In addition, from the expressionless front image data, a mesh where landmark points for face elements (eyebrows, eyes, nose and mouth) and landmark points selected by means of Delaunay triangulation are connected is generated, and distance vectors respectively representing distances of the landmark points are respectively extracted therefrom.

The landmark point means a distinctive portion of face elements (eyebrows, eyes, nose and mouth). The landmark point is extracted based on a contour of a facial appearance, a boundary of color, a curve point, a difference in brightness or the like, and thus generally a plurality of landmark points is extracted. For example, about 75 to 85 landmark points may be extracted.

The distance vector means a vector connecting two adjacent landmark points and gives intuitive information about a face structure. Since a plurality of landmark points is provided, a plurality of distance vectors is also configured. Therefore, the distance vectors are defined with a plurality of dimensions.

For example, when an m number of vectors are defined from a V1 vector to a Vm vector, a distance vector becomes an m-dimension vector. The distance vector may be measured in various ways like Euclidean distance, Mahalanobis distance or the like.

The facial image is normalized according to a square root of each face size, and then the facial image is stored in a database together with information about landmark points and distance vectors of each facial image and the score of the facial impression.

After that, the facial impression transformation process (S30) is performed.

Referring to FIG. 2, first, a target face whose facial impression is to be transformed is prepared (S11). The target face is obtained in real time from a camera, and an expressionless staring at front may be selected.

In addition, from the target face, landmark points for elements and distance vectors respectively representing distances of the landmark points are extracted (S31 and S33).

Based on the distance vectors of the target face, a learning data set similar to the target face is extracted from the database. The learning data set is composed of data having small distance vectors based on the input face.

In detail, in the present disclosure, in order to select learning data suitable for the target face, distances of all data stored in the database are compared, and then an n (here, n is a natural number) number of images having small distances from the target face are selected and used as the learning data. In other words, an n number of learning data is selected in order from a data most similar to the target face, instead of using a predetermined data set, and thus a result with high accuracy is expected.

In addition, the facial impression transformation (S40) of the present disclosure is performed separately into local transformation (S41) for determining shapes and sizes of elements of the face and global transformation (S43) for determining locations of the elements of the face.

In the local transformation (S41) of the face, a target function is generated based on the landmark points for the face elements (eyebrows, eyes, nose and mouth) of the n number of selected learning data and scores of a facial impression. At this time, in order to reduce an amount of calculation, the dimension of vectors composed of landmark points may be decreased by means of principal component analysis (PCA).

Figure 3:
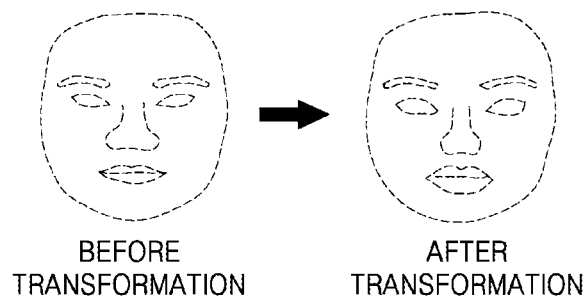
FIG. 3 is a diagram showing a local feature transformation, during a facial impression transforming process.

In addition, a log-likelihood term may be added to the generated target function so that the search region may be limited to the form of effective face elements by means of Gaussian distribution. Subsequently, shapes and sizes of face elements are determined by means of an optimization technique (see FIG. 3).

In the global transformation (S43) of the face, a target function is generated based on the distance vectors for global face features of the n number of selected learning data and scores of a facial impression.

A modified distance vector may be found by using the generated target function. Also, in order to reduce an amount of calculation, the dimension of distance vectors may be decreased by means of principal component analysis (PCA).

In addition, so that the result value of the optimization may be suitable for a face region, a log-likelihood term may be added to limit the search region to a face region. The log-likelihood term models a face region by using multi-variable Gaussian distribution.

Moreover, a modified distance vector for a specific facial impression may be found by means of an optimization technique. The modified distance vector is found after setting the distance vector of the target face model based on the generated target function as an initial point. As in Mathematic Formula 1 below, the modified distance vector ($f(\hat{x}')$) should be close to the distance vector ($f(x)$) of the target face model and also have a higher value for the facial impression.

$$f(x^{*'}) > f(x) f(\hat{x}') > f(x) \qquad \text{Mathematic Formula 1}$$

Figure 4:
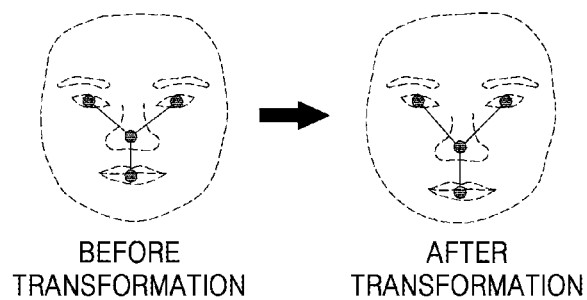
FIG. 4 is a diagram showing a global feature transformation, during a facial impression transforming process.

The landmark points are corrected to decrease an error in distance between the modified distance vector and the landmark points corresponding thereto. Based on the obtained result value, the location of each landmark point of the transformed face element is changed according to the result of the global transformation (see FIG. 4).

The facial impression transformation of the present disclosure may output a resultant image with a maximized transformation effect by using two stages of local transformation and global transformation (S45). Meanwhile, two stages may also be modified individually, and it is also possible to acquire a resultant image where a facial impression is transformed in consideration of only global features or a resultant image where a facial impression is transformed in consideration of only local features.

In addition, in the present disclosure, facial impression transformation may be performed for various facial impressions based on learning, and the image with a transformed facial impression may be utilized to treat not only a still image but also a moving image.

As a moving image tracing process (S50), angles and locations of the landmark points of the resultant image of the facial impression transformation process (S30), namely the finally transformed face, are arranged to landmark points of the initial face before transformation.

For a moving facial image, landmark points of the face are extracted in real time for each frame by means of a facial feature extracting technique. Subsequently, a difference value between the landmark points of the face extracted in real time and the landmark points of the initial face before transformation is obtained, and then the obtained value is added to the landmark points of the transformed face in real time.

An actual texture image of each frame input by a camera is warped based on the landmark points changing in real time and then output.

Figure 5A:
FIGS. 5A to 5C are diagrams exemplarily showing a moving picture with a transformed facial impression according to the present disclosure.
Figure 5B:
Figure 5C:

FIGS. 5A to 5C are diagrams exemplarily showing a moving picture with a transformed facial impression according to the present disclosure, where FIG. 5A is an original moving picture of Barack Obama, the President of the USA, FIG. 5B shows an example of a facial impression transformed into a baby face, and FIG. 5C shows an image where the facial impression is transformed into a wild shape.

The method for automatic facial impression transformation as described above may be implemented as an application or program commands executable by various kinds of computer means and recorded on a computer-readable recording medium. The computer-readable recording medium may include program commands, data files, data structures or the like solely or in combination.

The program commands recorded on the medium may be specially designed or configured for the present disclosure or known to and available by computer software engineers.

The computer-readable recording medium includes, for example, magnetic media such as a hard disk, a floppy disk and a magnetic tape, optical media such as CD-ROM and DVD, magneto-optical media such as a floptical disk, hardware devices such as ROM, RAM and a flash memory, specially configured to store and perform program commands, or the like.

The program commands include not only machine codes made by a complier but also high-level language codes executable by a computer by using an interpreter. The hardware device may be configured to operate as at least one software module to perform the operations of the present disclosure, or vice versa.

Figure 6:
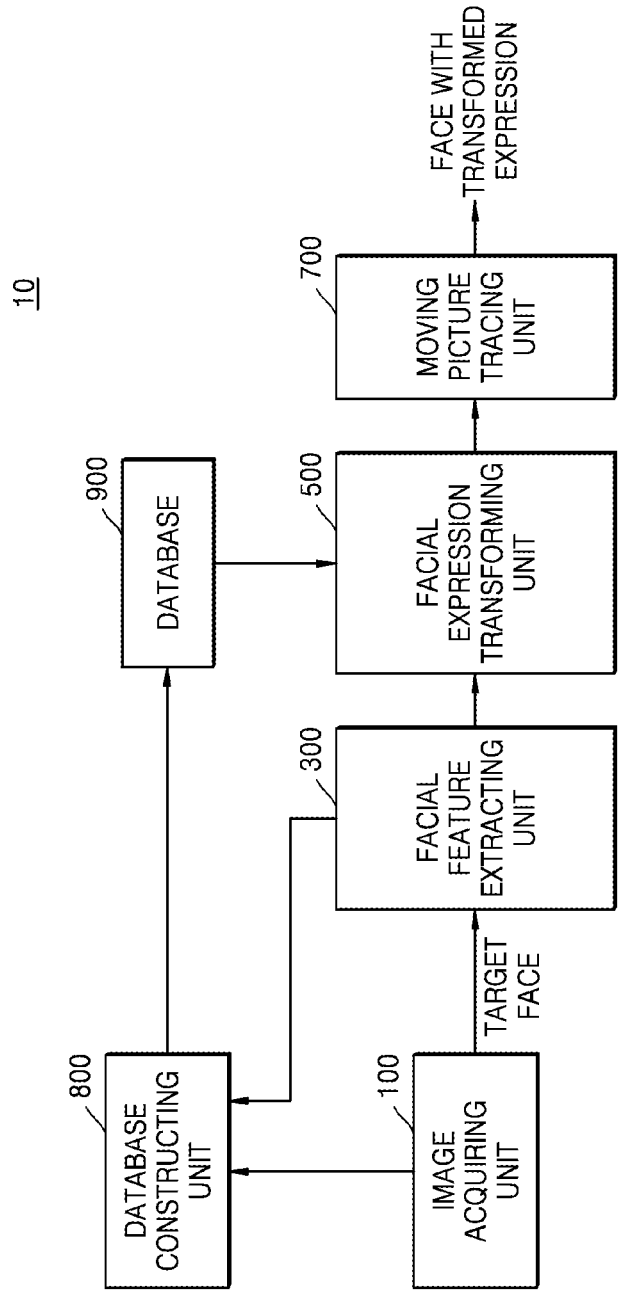
FIG. 6 is a block diagram showing a device for automatic facial impression transformation according to an embodiment of the present disclosure.
Figure 7:
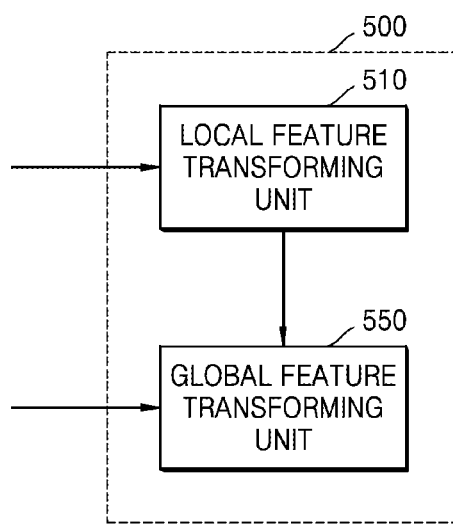
FIG. 7 is a block diagram showing a facial impression transforming unit, depicted in FIG. 6.

FIG. 6 is a block diagram showing a device for automatic facial impression transformation according to an embodiment of the present disclosure. FIG. 7 is a block diagram showing a facial impression transforming unit, depicted in FIG. 6.

The device 10 for automatic facial impression transformation (hereinafter, also referred to as a device) according to the present disclosure transforms a target face model into a desired facial impression for a video conference. The facial impression transformation is based on learning data and automatically transforms an overall facial impression in consideration of an identity of a corresponding person while keeping similarity to an original photograph. In addition, the facial impression is transformed into a facial impression desired by the user according to a target face model, and a target face is exhibited in real time as being substituted with a facial impression transformed as desired by the user.

Referring to FIG. 6, the device 10 according to the present disclosure includes a facial feature extracting unit 300, a facial impression transforming unit 500 and a moving picture tracing unit 700.

Software (or, an application) for performing automatic facial impression transformation may be installed and executed at the device 10 of the present disclosure, and components such as the facial feature extracting unit 300, the facial impression transforming unit 500 and the moving picture tracing unit 700 may be controlled by software for performing the automatic facial impression transformation, executed at the device 10.

The device 10 may be a separate terminal or a partial module of a terminal. In addition, the components such as the facial feature extracting unit 300, the facial impression transforming unit 500 and the moving picture tracing unit 700 may be configured as an integrated module or as at least one module. However, the components may also be configured as separate modules, on the contrary to the above.

The device 10 may be movable or stationary. The device 10 may be in the form of a server or an engine and may also be called with other terms such as a device, an apparatus, a terminal, a user equipment (UE), a mobile station (MS), a wireless device, a handheld device or the like.

The device 10 may execute or produce various kinds of software on the basis of an operation system (OS), namely a system. The operation system is a system program for allowing software to use hardware of a device and may employ all kinds of mobile computer operation systems such as Android OS, iOS, Windows mobile OS, Bada OS, Symbian OS, Blackberry OS or the like and all kinds of computer operation systems such as Windows series, Linux series, Unix series, MAC, AIX, HP-UX or the like.

Referring to FIG. 6, the device 10 may further include an image acquiring unit 100 for acquiring a target face whose facial impression is to be transformed, and a database constructing unit 800 for storing expressionless front facial images as well as landmark points and distance vectors extracted from the expressionless front facial images.

The image acquiring unit 100 may acquire expressionless front image data. The image acquiring unit 100 may acquire an image of a target face but also acquire expressionless front facial images for learning.

The database constructing unit 800 generates a mesh where landmark points for face elements (eyebrows, eyes, nose and mouth) and landmark points selected by means of Delaunay triangulation are connected, and stores distance vectors respectively representing distances of the landmark points in a database 900.

In addition, for learning, each data is evaluated into scores (for example, 1 to 7 points) depending on the degree of facial impression to be transformed. In an embodiment, a user may input a score for a facial impression, for example "baby-faced", "matured", "sharp", "gentle" or the like, and the score of the facial impression may be automatically calculated according to the input score and stored in the database 900.

The facial feature extracting unit 300 extracts landmark points of elements of a target face whose facial impression is to be transformed, and distance vectors respectively representing the landmark points.

The facial impression transforming unit 500 compares the distance vectors, selects an n (here, n is a natural number) number of learning data set from the database from a learning data most similar to the target face, extracts landmark points and distance vectors from the learning data set, and transforms the facial impression of the target face based on the extracted landmark points and distance vectors of the learning data set.

Referring to FIG. 7, the facial impression transforming unit 500 includes a local feature transforming unit 510 for determining shapes and sizes of elements of the target face and a global feature transforming unit 550 for determining locations and angles of the elements of the target face.

The local feature transforming unit 510 generates a target function based on the landmark points of the learning data set and the score of the facial impression and determines shapes and sizes of the elements of the target face based on the target function.

The global feature transforming unit 550 generates a target function based on the distance vectors of the learning data set and the score of the facial impression and determines locations and angles of the elements of the target face based on the target function.

The facial impression transformation of the present disclosure may output a resultant image with a maximized transformation effect by using two stages of local transformation and global transformation. Meanwhile, two stages may also be modified individually, and it is also possible to acquire a resultant image where a facial impression is transformed in consideration of only global features or a resultant image where a facial impression is transformed in consideration of only local features.

In addition, in the present disclosure, facial impression transformation may be performed for various facial impressions based on learning, and the image with a transformed facial impression may be utilized to treat not only a still image but also a moving image.

The moving picture tracing unit 700 outputs a transformed image in real time with respect to a moving target face. For this, angles and locations of the result image of the facial impression transformation, namely the landmark points of the finally transformed target face, are arranged to landmark points of an initial face before transformation.

For a moving facial image, landmark points of the face are extracted in real time for each frame by means of a facial feature extracting technique. A difference value between the landmark points of the face extracted in real time and the landmark points of the initial face before transformation is obtained, and then the obtained value is added to the landmark points of the transformed face in real time.

An actual texture image of each frame input by a camera is warped based on the landmark points changing in real time and then output.

In the present disclosure, the facial impression transformation is based on learning data and automatically transforms an overall facial impression in consideration of an identity of a corresponding person while keeping a face shape of the user. In addition, in the present disclosure, both local changes and global changes of the face are considered, and the facial impression may be transformed in various ways as selected by the user. Further, based on the transformed facial image, the facial impression transformation may also be performed to a moving picture.

Figure 8:
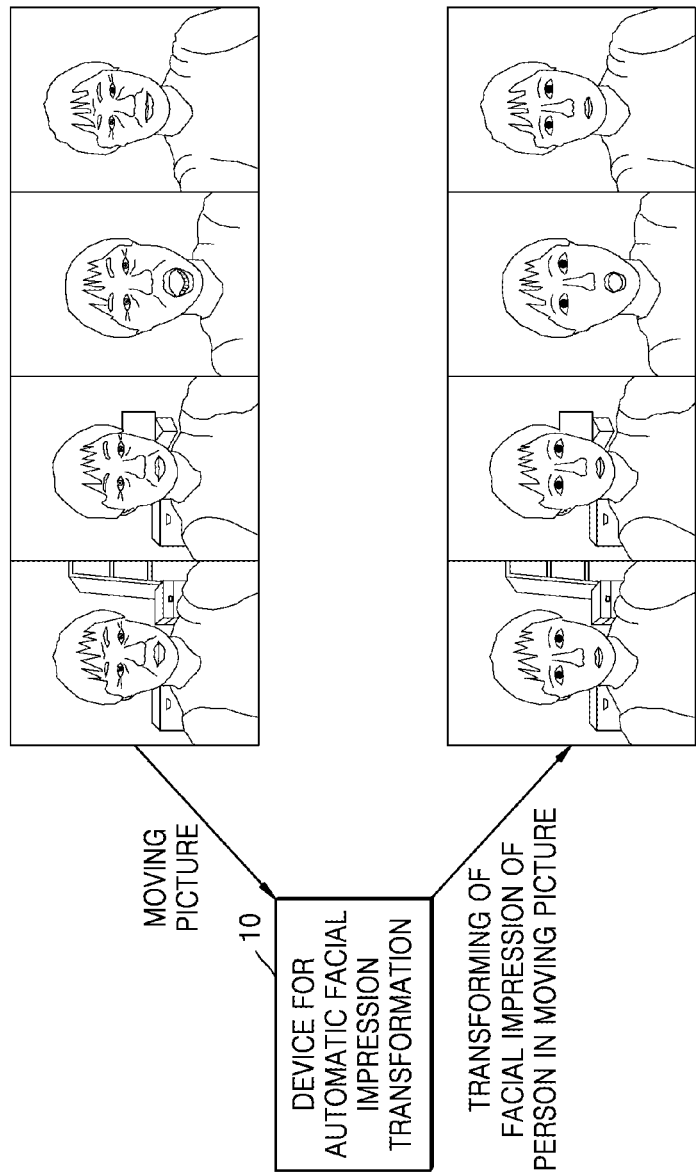
FIG. 8 is a diagram showing an example in which a device for automatic facial impression transformation transforms a facial impression of a person in a moving picture and provides the transformed facial impression, according to an embodiment of the present disclosure.

FIG. 8 is a diagram showing an example in which a device for automatic facial impression transformation transforms a facial impression of a person in a moving picture and provides the transformed facial impression, according to an embodiment.

Referring to FIG. 8, the device 10 for automatic facial impression transformation may photograph a moving picture, transform a facial impression of a person in the photographed moving picture, and provide the transformed facial impression.

The device 10 for automatic facial impression transformation according to the embodiment may analyze landmark points from the facial image in the moving picture and transform the facial impression of the face by transforming at least one of sizes, shapes, and arrangements of face elements (for example, eyes, nose, mouth, and eyebrows). The landmark points may be parts having information distinguishable from other parts in the facial image and may be values representing boundaries, curves, a difference in contrast, or the like of the face elements.

The device 10 for automatic facial impression transformation may photograph a moving picture according to the execution of, for example, a software program for a moving picture photographing service, a moving picture reproducing service, a video chatting service, a video conferencing service, or the like, and may transform a facial impression of a face in the photographed moving picture.

The device 10 for automatic facial impression transformation according to the embodiment may separately perform a local facial impression transforming process and a global facial impression transforming process of transforming the facial impression of the face in the moving picture. The local facial impression transforming process may be a process of transforming at least one of the sizes and the shapes of the face elements in the face, and the global facial impression transforming process may be a process of transforming the arrangement between the face elements in the face. In the embodiment, since the local facial impression transforming process and the global facial impression transforming process are separately performed, the facial impression of the face in the moving picture may be efficiently transformed. For example, the device 10 for automatic facial impression transformation may selectively perform the local facial impression transforming process or the global facial impression transforming process by taking into account the current processing load.

FIG. 8 shows an example in which the device 10 for automatic facial impression transformation performs the local facial impression transforming process on the photographed moving picture (for example, transforms sizes and shapes of a face contour, eyes, nose, and mount) so that the facial impression of the facial image in the moving picture becomes younger, and outputs the transformed moving picture in real time. In addition, in the embodiment, the facial impression transformation may be maximized by performing the local facial impression transforming process and the global facial impression transforming process together.

Hereinafter, it is assumed that the device 10 for automatic facial impression transformation performs the local facial impression transforming process and selectively performs the global facial impression transforming process. However, the embodiment is not limited thereto, and embodiments in which the global facial impression transforming process is performed and the local facial impression transforming process is selectively performed, or both the local facial impression transforming process and the global facial impression transforming process are performed may be construed as including the scope of the present disclosure.

The device 10 for automatic facial impression transformation may be a smart phone, but is not limited thereto. The device 10 for automatic facial impression transformation may be implemented by various devices including TVs, mobile phones, tablet PCs, digital cameras, camcorders, laptop computers, desktops, personal digital assistants (PDAs), portable multimedia players, wearable devices, medical devices, or the like. The device 10 for automatic facial impression transformation is not limited to the above-described devices, and may include new devices according to the technical development.

Figure 9:
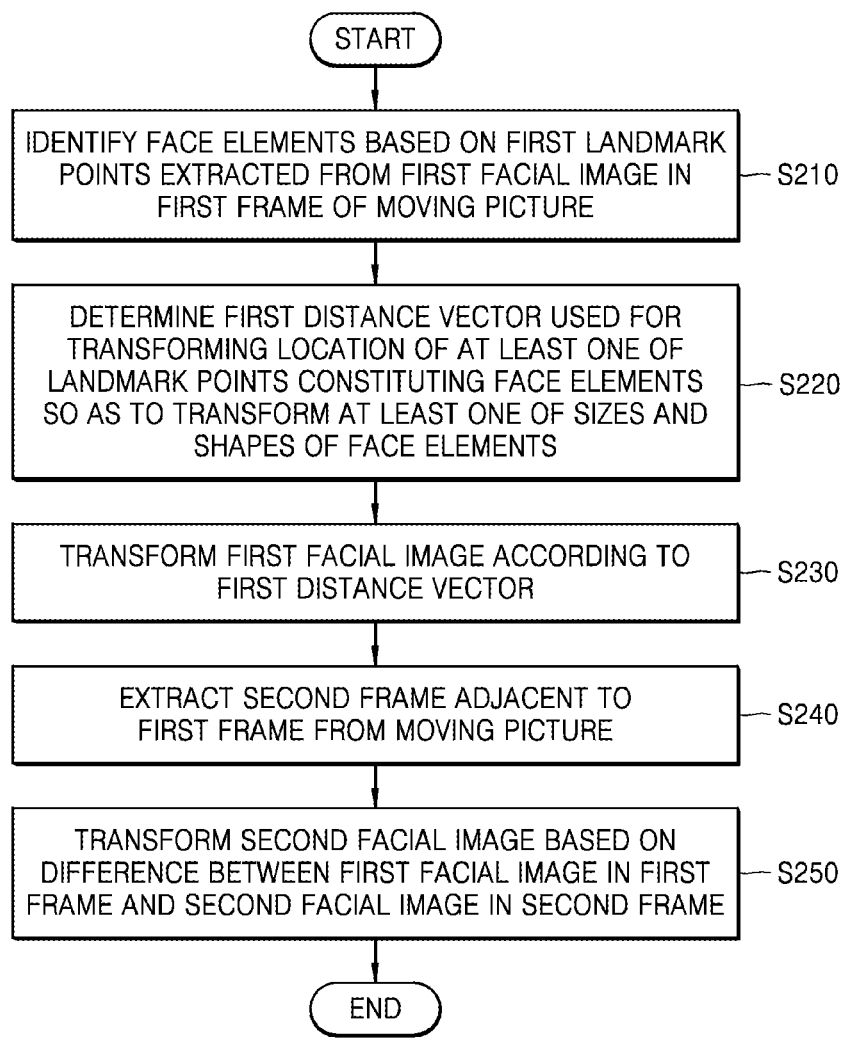
FIG. 9 is a flowchart showing a method by which a device for automatic facial impression transformation transforms a facial impression of a person in a moving picture, according to an embodiment of the present disclosure.

FIG. 9 is a flowchart showing a method by which the device for automatic facial impression transformation transforms a facial impression of a person in a moving picture, according to an embodiment.

Referring to FIG. 9, in operation S210, the device 10 for automatic facial impression transformation identifies face elements based on first landmark points extracted from a first facial image in a first frame of a moving picture.

The moving picture may be constituted of a plurality of frames generated by photographing a dynamic subject at certain time intervals (for example, 0.1 seconds, or the like). The device 10 for automatic facial impression transformation may acquire the first frame from among the plurality of frames constituting the moving picture and identify the first facial image from the first frame. For example, the device 10 for automatic facial impression transformation may identify the first facial image by analyzing points, lines, surfaces, or the like in the first frame. Alternatively, the device 10 for automatic facial impression transformation may identify the first facial image by analyzing a color distribution in the first frame. Alternatively, the device 10 for automatic facial impression transformation may identify the first landmark points from the identified first facial image.

Alternatively, the device 10 for automatic facial impression transformation may extract a predetermined region, which is expected to have the first facial image, in the first frame and extract landmark points from the predetermined region. For example, the device 10 for automatic facial impression transformation may provide a user interface of inducing a location of a face of a subject to a preset location in a field of view (FOV) at the time of photographing a moving picture. Alternatively, the device 10 for automatic facial impression transformation may extract first landmark points from the preset location.

According to an embodiment, the device 10 for automatic facial impression transformation may extract the first landmark points from the first facial image (or the predetermined region) by using a Harris corner algorithm, a Shi & Tomasi algorithm, a Scale Invariant Feature Transform (SIFT) algorithm, a SIFT-DOG algorithm, a Features from Accelerated Segment Test (FAST) algorithm, a Binary robust independent elementary features (BRIEF) algorithm, an Adaptive and generic corner detection based on the accelerated segment test (AGAST) algorithm, or a combination thereof. However, the embodiment is not limited thereto, and landmark points may be extracted by new algorithms according to the technical development.

According to an embodiment, the device 10 for automatic facial impression transformation may identify the face elements based on the extracted first landmark points.

In operation S220, the device 10 for automatic facial impression transformation determines a first distance vector used for transforming a location of at least one of landmark points constituting the face elements, so as to transform at least one of sizes and shapes of the face elements. The device 10 for automatic facial impression transformation may transform at least one of sizes and shapes of the face elements in the first frame, so as to transform the facial impression of the facial image in the first frame. In addition, the device 10 for automatic facial impression transformation may acquire a comparison target facial image similar to the first facial image and acquire, from the acquired comparison target facial image, a first distance vector for transforming a location of at least one of landmark points constituting the face elements in the first facial image.

The comparison target facial image may be a facial image stored in a server and may be previously matched as a predetermined facial impression by evaluators. The server may store and/or manage a plurality of comparison target facial images and provide a comparison target facial image similar to the first facial image in response to a request from the device 10 for automatic facial impression transformation. Meanwhile, the plurality of comparison target facial images may be images obtained by photographing different subjects.

Specifically, the device 10 for automatic facial impression transformation may acquire N comparison target facial images having a similarity of a predetermined value or more with respect to the first facial image in the first frame. In addition, the device 10 for automatic facial impression transformation may select at least one comparison target facial image corresponding to the target facial impression type among the N comparison target facial images. The facial impression type may represent, for example, facial impressions such as "younger", "older", "gentle", "sharp", "angry", or "scary"

In addition, the device 10 for automatic facial impression transformation may determine a first distance vector representing a distance and a direction between landmark points constituting sizes and shapes of the face elements in the comparison target facial images among the landmark points extracted from the selected comparison target facial image. The first distance vector may be, for example, a vector connecting two arbitrary landmark points constituting one face element.

Meanwhile, the device 10 for automatic facial impression transformation may manage and store information about the plurality of comparison target facial images. In this case, the device 10 for automatic facial impression transformation may extract N comparison target facial images similar to the first facial image in the first frame among the plurality of comparison target facial images stored in the device 10 for automatic facial impression transformation, and determine a comparison target facial image corresponding to the target facial impression type among the extracted N comparison target facial images.

In operation S230, the device 10 for automatic facial impression transformation transforms the first facial image according to the first distance vector. The device 10 for automatic facial impression transformation may transform the first facial image by moving locations of landmark points constituting the face elements in the first facial image by using the first distance vector.

According to an embodiment, the device 10 for automatic facial impression transformation may divide the face elements in the first facial image into a plurality of triangles and store information about the plurality of triangles in the memory together with the first facial image. For example, the device 10 for automatic facial impression transformation may divide the face elements in the first facial image into the plurality of triangles by using first landmark points in the first facial image.

In addition, the device 10 for automatic facial impression transformation may move locations of landmark points in the first facial image so that the landmark points constituting the sizes and shapes of the face elements in the first facial image correspond to the first distance vector. When the locations of the landmark points in the first facial image are moved, the device 10 for automatic facial impression transformation may transform the images within the triangles having the moved landmark features as the vertices, based on the moved locations of the landmark points. In this case, the device 10 for automatic facial impression transformation may extract the images corresponding to the triangles from the memory and correct the image within the triangles while transforming the vertices of the triangles based on the moved locations.

In operation S240, the device 10 for automatic facial impression transformation extracts a second frame adjacent to the first frame from the moving picture. For example, the device 10 for automatic facial impression transformation may acquire the second frame continuous to the first frame from the photographing device in the device 10 for automatic facial impression transformation. Alternatively, when the device 10 for automatic facial impression transformation receives the moving picture from the outside, the device 10 for automatic facial impression transformation may receive the first frame and then receive the second frame.

In operation S250, the device 10 for automatic facial impression transformation may transform a second facial image in the second frame based on a difference between the first facial face in the first frame and the second facial image in the second frame. The device 10 for automatic facial impression transformation may predict locations of landmark points in the second facial image after transformation by using the difference between the first facial image before transformation and the second facial image. In addition, the device 10 for automatic facial impression transformation may transform the second facial image by using the predicted locations of the landmark points.

Specifically, the device 10 for automatic facial impression transformation may determine a third distance vector representing a difference between the first landmark points in the first facial image before transformation and the second landmark points extracted from the second facial image. In addition, the device 10 for automatic facial impression transformation may extract third landmark points, which correspond to the first landmark points in the first facial image before transformation, in the first facial image after transformation. That is, the third landmark points may represent locations to which the first landmark points in the first facial image before transformation are moved based on the first distance vector.

In addition, when the second facial image is transformed, the device 10 for automatic facial impression transformation may determine fourth landmark points to which the second landmark points in the second facial image before transformation are to be moved. In this case, the fourth landmark points may be determined based on the third distance vector and the third landmark points.

The device 10 for automatic facial impression transformation may transform the second facial image by moving the locations of the second landmark points in the second facial image before transformation to the locations of the fourth landmark points. For example, the device 10 for automatic facial impression transformation may divide the face elements in the second facial image into a plurality of triangles by using the second landmark points and store information about the plurality of triangles in the memory together with the second facial image. When the locations of the second landmark points in the second facial image before transformation are moved to the locations of the fourth landmark points, the device 10 for automatic facial impression transformation may correct the images corresponding to the triangles by moving the vertices of the triangles. For example, the device 10 for automatic facial impression transformation may extract the images corresponding to the triangles and transform the images within the triangles based on the moved vertices of the triangles.

According to another embodiment, the device 10 for automatic facial impression transformation may transform the second facial image in the second frame by using the first distance vector. For example, the device 10 for automatic facial impression transformation may divide the second facial image in the second frame into a plurality of triangles based on the second landmark points in the second facial image, and transform the facial image in the second frame by moving the locations of the vertices of the triangles according to the first distance vector.

Meanwhile, the device 10 for automatic facial impression transformation may repeat operations S240 and S250 on M frames. For example, the device 10 for automatic facial impression transformation may extract a third frame adjacent to the second frame from the moving picture and transform the facial image in the third frame based on a difference between the facial image in the second frame and the facial image in the third frame.

Figure 10:
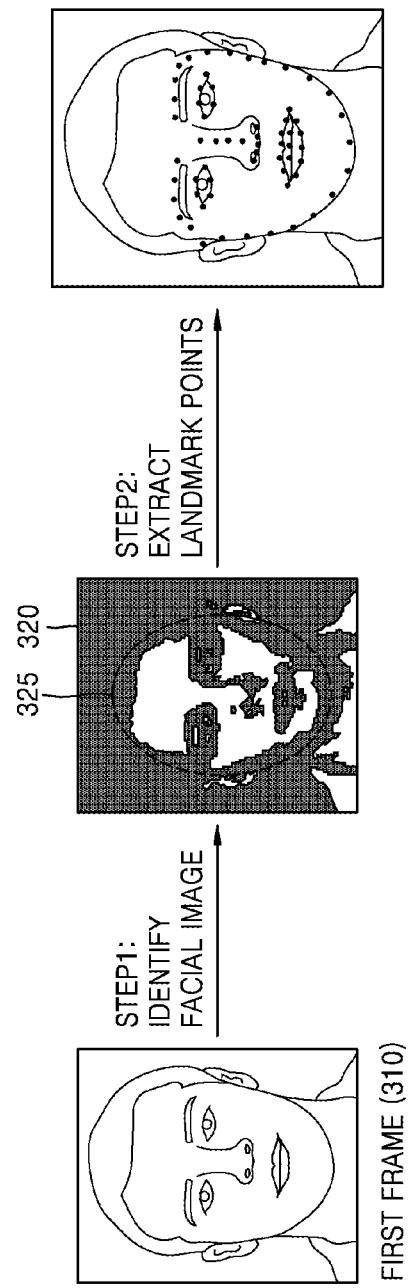
FIG. 10 is a diagram showing an example in which a device for automatic facial impression transformation extracts landmark points from a first frame of a moving picture.

FIG. 10 is a diagram showing an example in which the device for automatic facial impression transformation extracts the landmark points from the first frame of the moving picture.

Referring to FIG. 10, the device 10 for automatic facial impression transformation may identify a predetermined region corresponding to a first facial image based on a color distribution in a first frame 310 of a moving picture, and extract landmark points from the identified first facial image.

Step 1: The device 10 for automatic facial impression transformation may extract a predetermined region 325 representing a face color by using the color distribution in the first frame 310.

According to an embodiment, the device 10 for automatic facial impression transformation may compare pixel values in the first frame 310 with a threshold value. The threshold value may be a preset value or a preset range as the face color. The pixel values may include not only a color of a subject but also values (for example, a brightness value) predetermined by other factors (for example, lighting, light sources, or the like). Therefore, according to an embodiment, the device 10 for automatic facial impression transformation may remove the values determined by other factors from the pixel values in the first frame 310. 320 in FIG. 10 is an example in which the device 10 for automatic facial impression transformation removes a brightness value from the pixel values in the first frame 310. As such, the device 10 for automatic facial impression transformation may compare the pixel values, from which the brightness value is removed, with the threshold value and identify the predetermined region 325 expected as the first facial image in the first frame.

Step 2: The device 10 for automatic facial impression transformation may extract landmark points from the predetermined region 325.

Figure 11:
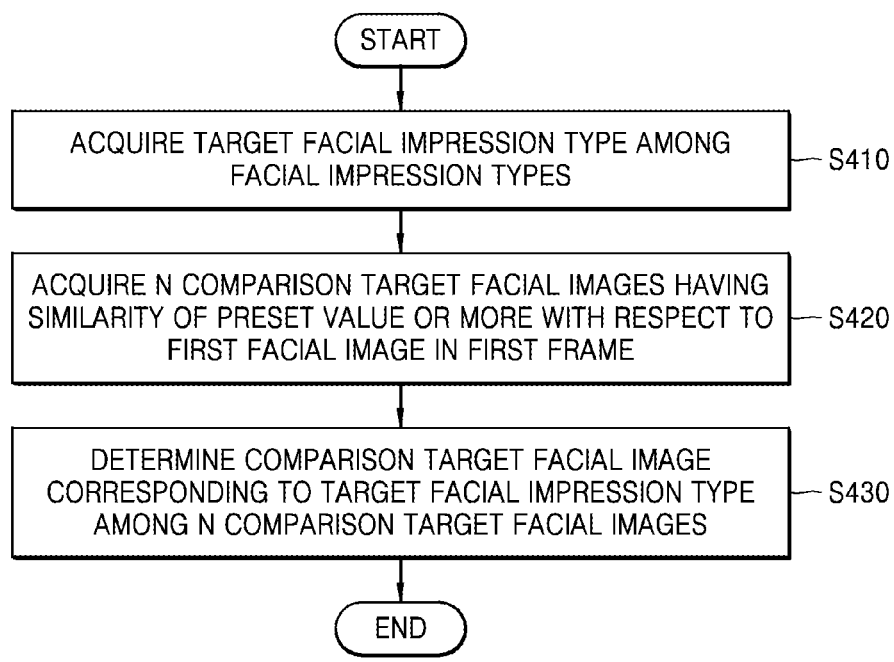
FIG. 11 is a flowchart showing a method by which a device for automatic facial impression transformation determines a comparison target facial image corresponding to a target facial impression type.

FIG. 11 is a flowchart showing a method by which the device for automatic facial impression transformation determines a comparison target facial image corresponding to a target facial impression type.

Referring to FIG. 11, in operation S410, the device 10 for automatic facial impression transformation may acquire a target facial impression type from among a plurality of facial impression types. The device 10 for automatic facial impression transformation may provide a user interface of selecting a target facial impression before the photographing of the moving picture is started, so as to receive a user input of selecting the target facial interface type from among the plurality of facial impression types.

For example, the device 10 for automatic facial impression transformation may provide a facial impression type list and receive a user input of selecting one of the facial impression type list. Alternatively, the device 10 for automatic facial impression transformation may receive at least one frame by the photographing device (for example, a camera or the like) before the photographing of the moving picture is started, transform the received at least one frame into each of the plurality of facial impression types, and provide a preview image in which a facial impression of a person in at least one frame is transformed. In this case, the device 10 for automatic facial impression transformation may receive a user input of selecting one of the provided preview images.

Alternatively, the device 10 for automatic facial impression transformation may determine an arbitrary facial impression type as a target facial impression type. Alternatively, the device 10 for automatic facial impression transformation may provide a configuration window of presetting a target facial impression type. In this case, the device 10 for automatic facial impression transformation may omit operation S410. When there is a preset facial impression type, the device 10 for automatic facial impression transformation may determine the preset facial impression type as the target facial impression type.

In operation S420, the device 10 for automatic facial impression transformation may acquire N comparison target facial images having a similarity of a predetermined value or more with respect to the first facial image in the first frame. The device 10 for automatic facial impression transformation may determine the similarity of the first facial image and the comparison target facial image by comparing a vector value connecting the face contour to the face elements in the first facial image with a vector value connecting the face contour in the comparison target facial image to the face elements.

Specifically, the device 10 for automatic facial impression transformation may calculate L vectors connecting the landmark points constituting the face contour in the first image to the landmark points constituting the face elements in the face contour. The device 10 for automatic facial impression transformation may calculate the L vectors by using a distance measurement algorithm such as an Euclidean distance value or a Mahalanobis distance.

Meanwhile, the device 10 for automatic facial impression transformation may normalize the L vectors (that is, L-dimension vectors). In this manner, the device 10 for automatic facial impression transformation may reduce a load required for determining a similarity between the first facial image and the comparison target facial images. For example, the device L for automatic facial impression transformation may normalize the L-dimension vector a vector of a lower dimension (for example, L/2-dimension vector or the like) by applying a principal component analysis (PCA) algorithm to the L vectors.

According to an embodiment, the device 10 for automatic facial impression transformation may access a server (for example, a cloud server, a web server, a database, or the like) storing a plurality of comparison target facial images, and acquire N comparison target facial images having a similarity of a preset value or more (for example, about −3 to +4) with respect to the normalized vector. The similarity may be a difference between the normalized vector and the vector calculated from the comparison target facial image. Therefore, the similarity may be higher as the difference the normalized vector and the vector calculated from the comparison target facial image is closer to 0.

Meanwhile, the server may previously perform a process of extracting landmark points, a process of calculating a vector between landmark points, a process of normalizing the calculated vector, and a process of matching a facial impression type on the plurality of comparison target facial images. The process of matching the facial impression type may be a process of classifying the vectors (for example, the normalized vector) calculated from the plurality of comparison target facial images with respect to each facial impression type.

In operation S430, the device 10 for automatic facial impression transformation may determine a comparison target facial image corresponding to a target facial impression type among N comparison target facial images.

According to an embodiment, the device 10 for automatic facial impression transformation may compare the facial impression types matching the N comparison target facial images and determine at least one comparison target facial image corresponding to the target facial impression type.

When two or more comparison target facial images are determined, the device 10 for automatic facial impression transformation may compare vectors between landmark points extracted from two or more comparison target facial images and determine one comparison target facial image. The method by which the device 10 for automatic facial impression transformation determines one of two or more comparison target facial images will be described in detail with reference to FIG. 7.

Figure 12:
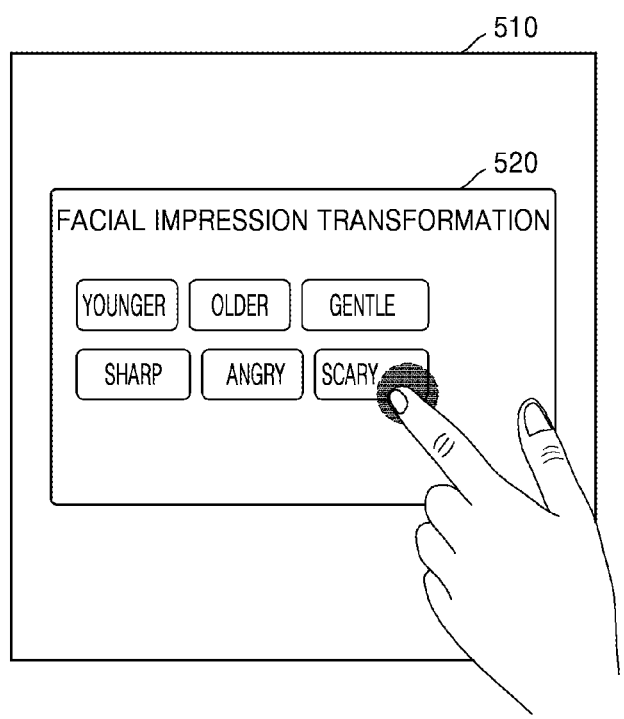
FIG. 12 is a diagram showing an example in which a device for automatic facial impression transformation provides a user interface of selecting a target facial impression type.

FIG. 12 is a diagram showing an example in which the device for automatic facial impression transformation provides a user interface of selecting a target facial impression type.

Referring to FIG. 12, the device 10 for automatic facial impression transformation may provide a user interface 520 of selecting a target facial impression type through a display 511 provided in the device 10 for automatic facial impression transformation. For example, before photographing or reproducing the moving picture, the device 10 for automatic facial impression transformation may provide a user interface 520 of determining the target facial impression type for transforming the facial impression of the person in the moving picture.

Alternatively, before photographing the moving picture, the device 10 for automatic facial impression transformation may provide the user interface 520 of determining the target facial impression type for transforming the facial impression of the person in the moving picture. When the user interface 520 is provided during the photographing of the moving picture, the device 10 for automatic facial impression transformation may perform operations S210 to S250 of FIG. 2 on the frames photographed (or reproduced) after the user input for the user interface 520 is received.

Meanwhile, the device 10 for automatic facial impression transformation may output visual and/or auditory data representing various facial impression types (for example, "younger", "older", "gentle", or the like) through the user interface 520.

Figure 13:
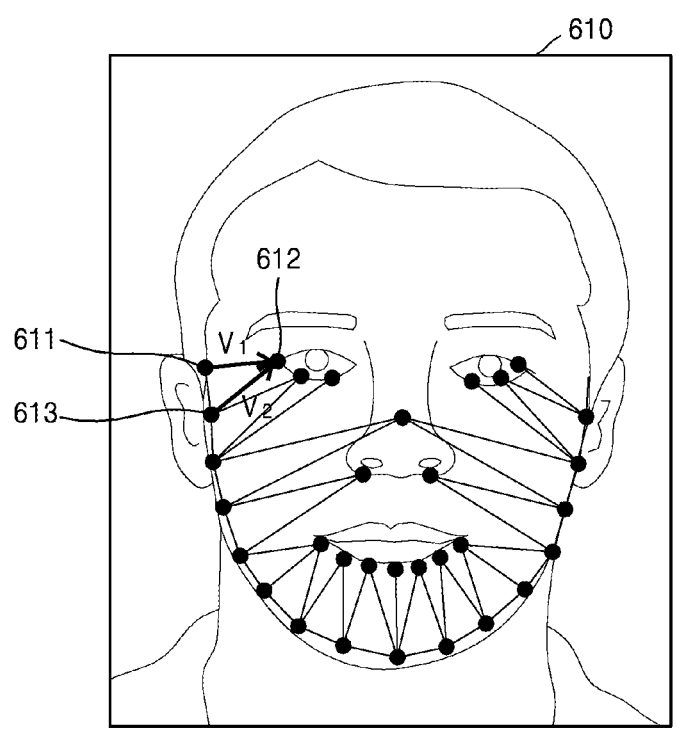
FIG. 13 is a diagram showing an example in which a device for automatic facial impression transformation determines vectors between landmark points extracted from a facial image of a first frame.

FIG. 13 is a diagram showing an example in which the device for automatic facial impression transformation determines a vector between landmark points extracted from a facial image of a first frame.

Referring to FIG. 13, the device 10 for automatic facial impression transformation may determine L vectors connecting landmark points (for example, 611, 613, or the like) constituting the face contour to landmark points (for example, 612, or the like) constituting the face elements, among landmarks (represented by points) extracted from a first facial image of a first frame 610.

For example, the device 10 for automatic facial impression transformation may determine V1 including the distance and direction from the landmark point 611 constituting the face contour to the landmark point 612 constituting the eyes. In addition, the device 10 for automatic facial impression transformation may determine V2 including the distance and direction from another landmark point 513 constituting the face contour to the landmark point 612 constituting the eyes. As such, the device 10 for automatic facial impression transformation may determine L vectors V1, V2, . . . , VL including the distances and directions from the landmark points constituting the face contour to the landmark points constituting the face elements. In addition, the device 10 for automatic facial impression transformation may normalize the acquired L vectors.

Meanwhile, the L vectors represent the relationship between the face contour and the face element, and the device 10 for automatic facial impression transformation may use the L vectors to extract the comparison target facial images similar to the face shape of the subject among the plurality of comparison target facial images. In this manner, the device 10 for automatic facial impression transformation according to the embodiment may naturally transform the facial impression of the face in the moving picture by using the comparison target facial images similar to the face shape of the subject.

Figure 14:
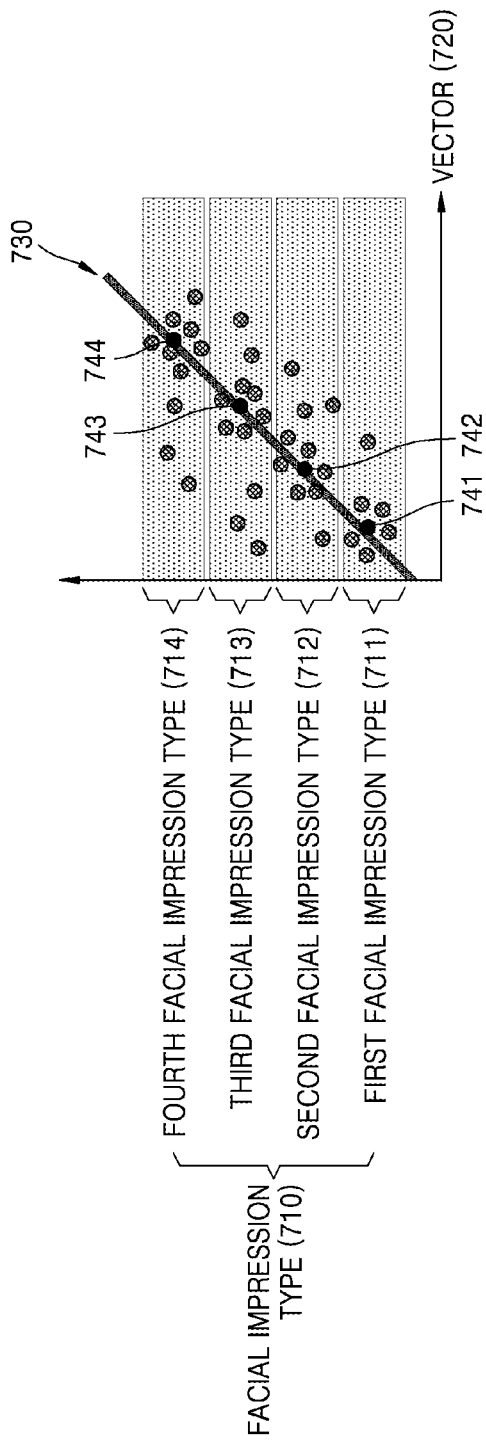
FIG. 14 is a diagram showing an example in which a device for automatic facial impression transformation compares vectors between landmark points extracted from two or more comparison target facial images and determines one comparison target facial image.

FIG. 14 is a diagram showing an example in which the device for automatic facial impression transformation compares vectors between landmark points extracted from two or more comparison target facial images and determines one comparison target facial image.

Referring to FIG. 14, the device 10 for automatic facial impression transformation may acquire a correlation function 730 between the facial impression type 710 and the vector 720 between the landmark points extracted from the comparison target facial image. The vector 720 may be obtained by normalizing L vectors from the landmark points constituting the face contour to the landmark points constituting the face elements.

According to an embodiment, the device 10 for automatic facial impression transformation may acquire the correlation function 730 based on the vector distribution (represented by points) with respect to each facial impression type. For example, the device 10 for automatic facial impression transformation may acquire the correlation function 730 by connecting the locations 741 to 744 having the highest distribution degree with respect to each facial impression type. Alternatively, the device 10 for automatic facial impression transformation may access the server and acquire the correlation function 730 stored in the server.

According to an embodiment, when two or more comparison target facial images corresponding to the specific facial impression type are acquired, the device 10 for automatic facial impression transformation may compare values of the correlation function 730 corresponding to each comparison target facial impression image. For example, the device 10 for automatic facial impression transformation may compare result values obtained by substituting vectors between landmark points extracted from two or more comparison target facial images into the correction function 730, and select the comparison target facial image having higher result values.

Meanwhile, a case where the correlation function 730 linearly increases is shown in FIG. 14, but embodiments of the present disclosure are not limited thereto. For example, the correlation function 730 may have different slopes (or curve shapes) according to the facial impression type.

Figure 15:
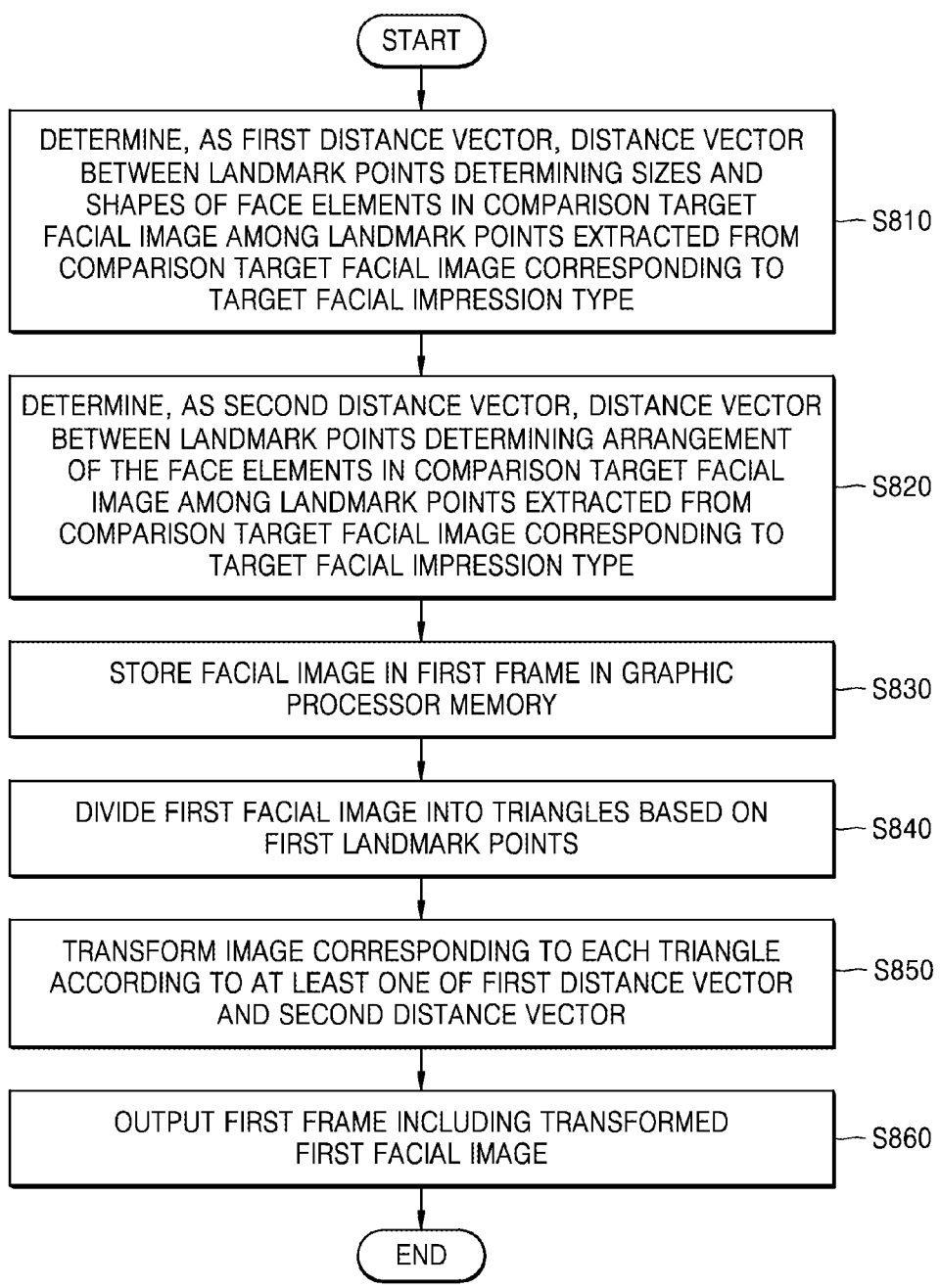
FIG. 15 is a flowchart showing a method by which a device for automatic facial impression transformation transforms a first facial image in a first frame according to first and second distance vectors.

FIG. 15 is a flowchart showing a method by which the device for automatic facial impression transformation transforms a first facial image in a first frame according to first and second distance vectors.

Referring to FIG. 15, the method of transforming the first facial image may include a local transformation of transforming at least one of sizes and shapes of face elements in a facial image and a global transformation of transforming arrangement of face elements of a facial image.

In operation S810, the device 10 for automatic facial impression transformation may determine, as a first distance vector, a distance vector between landmark points determining the sizes and shapes of the face elements in the comparison target facial image among landmark points extracted from the comparison target facial image corresponding to the target facial impression type.

According to an embodiment, the device 10 for automatic facial impression transformation may determine, as a first distance vector, a distance vector connecting two arbitrary landmark points constituting one face element in the comparison target facial image. For example, the first distance vector may include at least one distance vector between landmark points constituting the eyes in the comparison target facial image, at least one distance vector between landmark points constituting the nose, and at least one distance vector between landmark points constituting the mouth.

In operation S820, the device 10 for automatic facial impression transformation may determine, as a second distance vector, a distance vector between landmark points determining the arrangement between the face elements in the comparison target facial image among landmark points extracted from the comparison target facial image corresponding to the target facial impression type. The device 10 for automatic facial impression transformation may determine the second distance vector for transforming the arrangement between face elements in the first facial image in the first frame (that is, the global facial impression transformation).

According to an embodiment, the device 10 for automatic facial impression transformation may determine, as the second distance vector, a distance vector connecting two arbitrary landmark points constituting different face elements in the comparison target facial image. For example, the second distance vector may include at least one distance vector between landmark points constituting the eyes and the nose in the comparison target facial image, at least one distance vector between landmark points constituting the eyes and the mouth, and at least one distance vector between landmark points constituting the nose and the mouth.

In operations S810 and S820, the device 10 for automatic facial impression transformation may acquire the predetermined first distance vector and second distance vector. For example, the device 10 for automatic facial impression transformation may acquire the first and second distance vectors corresponding to a specific facial impression type from the server. The server may store and/or manage expressionless comparison target facial images, and may store and manage first and second distance vectors for transforming each comparison target facial image into various facial impression types. Therefore, the device 10 for automatic facial impression transformation may select the comparison target facial image similar to the first facial image in the first frame and acquire, from the server, first and second vectors for transforming the comparison target facial image into the target facial impression type.

In operation S830, the device 10 for automatic facial impression transformation may store the facial image in the first frame in a graphic processor memory. For example, the device 10 for automatic facial impression transformation may store the facial image in the first frame in a graphic processor memory (for example, a texture memory). The graphic processor memory may be a memory configured to store image data for an image rendering process and an image output process.

In operation S840, the device 10 for automatic facial impression transformation may divide a first facial image into a plurality of triangles based on first landmark points. For example, the device 10 for automatic facial impression transformation may divide the face elements in the first facial image into triangular meshes based on the first landmark points by using a Delaunay triangulation method. In addition, the device 10 for automatic facial impression transformation may store information about the triangular meshes in the graphic processor memory.

The case where the device 10 for automatic facial impression transformation divides the face elements in the first facial image into the plurality of triangles has been described in the above embodiments, but embodiments of the present disclosure are not limited thereto. The device 10 for automatic facial impression transformation may divide the facial image into various shapes (for example, rectangles, pentagons, or the like).

In operation S850, the device 10 for automatic facial impression transformation may transform an image corresponding to each triangle according to at least one of the first distance vector and the second distance vector. When the first landmark points are moved according to at least one of the first distance vector and the second distance vector, the device 10 for automatic facial impression transformation may transform the image corresponding to each triangle based on the moved vertices.

For example, the device 10 for automatic facial impression transformation may move the locations of the landmark points constituting the first face element in the first facial image so that the distance vector between the landmark points constituting the first facial element in the first facial image becomes equal (or similar) to the distance vector between the landmark features constituting the first facial element in the comparison target facial image among the first distance vectors. In addition, the device 10 for automatic facial impression transformation may move the locations of the landmark points distributed in the first and second face elements in the first facial image so that the distance vector connecting the first face element and the second face element in the first facial image becomes equal (or similar) to the distance vector connecting the first and second face elements in the comparison target facial image among the second distance vectors.

In addition, when the location of at least one of the first landmark points is moved, the device 10 for automatic facial impression transformation may transform the triangular meshes stored in the graphic processor memory. For example, the device 10 for automatic facial impression transformation may read the image corresponding to each triangular mesh from the graphic processor memory and warp (for example twist, extend, or the like) the read image based on the locations of the moved landmark points.

In operation S860, the device 10 for automatic facial impression transformation may output the first frame including the transformed first facial image. Alternatively, the device 10 for automatic facial impression transformation may transmit the first frame to another device for automatic facial impression transformation, or may store the first frame without outputting the first frame.

Figure 16:
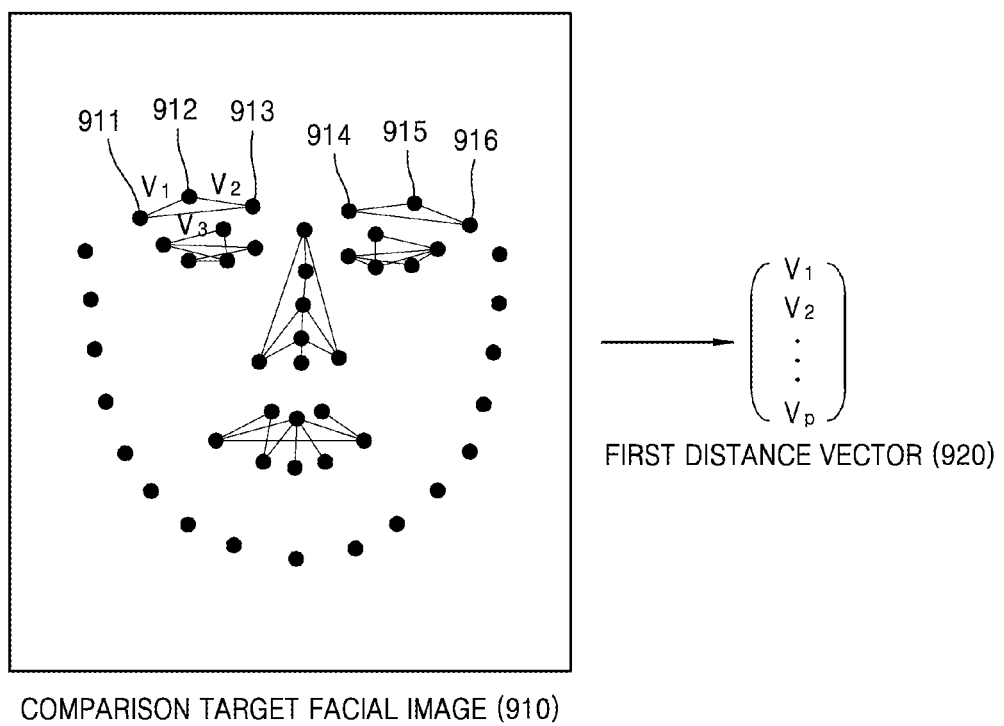
FIG. 16 is a diagram showing an example of the first distance vector.

FIG. 16 is a diagram showing an example of the first distance vector.

Referring to FIG. 16, the device 10 for automatic facial impression transformation may determine, as a first distance vector, a distance vector between landmark points constituting sizes and shapes of face elements (for example, eyes, nose, mouth, and eyebrows) among landmark points (represented by points) extracted from a comparison target image 910 corresponding to a target facial impression type. For example, the device 10 for automatic facial impression transformation may determine distance vectors V1, V2, . . . , V6 between first to sixth landmark points 911 to 916 constituting the size and shape of the eyebrows.

The device 10 for automatic facial impression transformation may determine P distance vectors V1, V2, . . . Vp related to the size and shape of each face element as the first distance vector 920.

Figure 17:
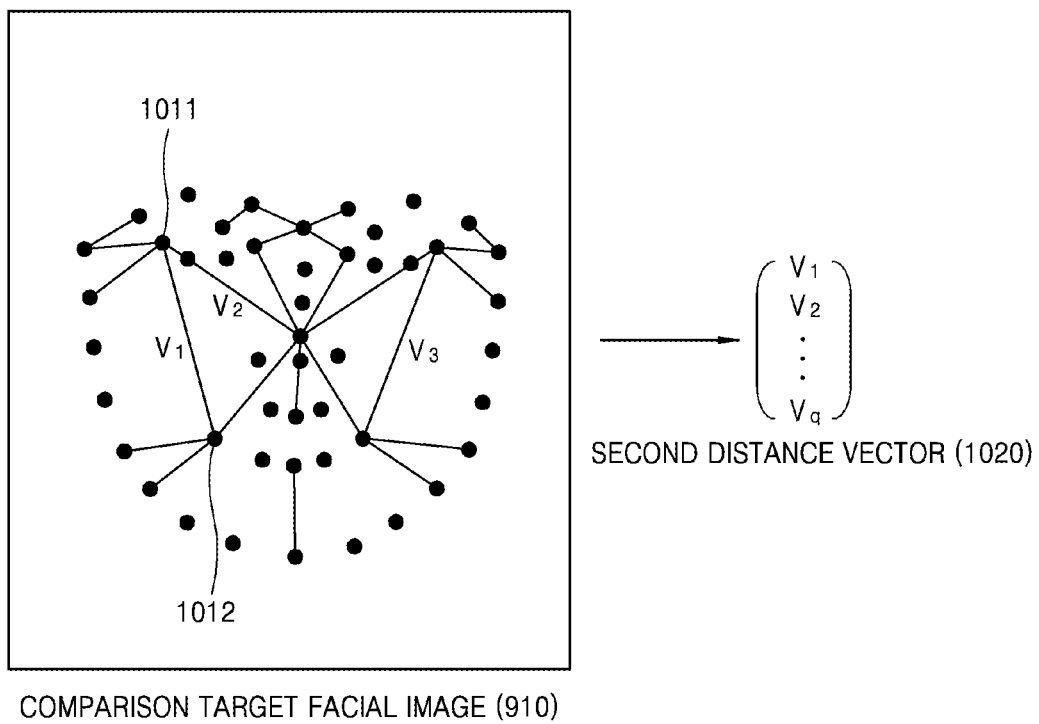
FIG. 17 is a diagram showing an example of the second distance vector.

FIG. 17 is a diagram showing an example of the second distance vector.

Referring to FIG. 17, the device 10 for automatic facial impression transformation may determine, as the second distance vector, a distance vector between landmark points constituting the arrangement of face elements among landmark points (represented by points) extracted from the comparison target image 910 corresponding to the target facial impression type. To this end, the device 10 for automatic facial impression transformation may determine distance vectors between landmark points constituting different face elements. For example, the device 10 for automatic facial impression transformation may determine a distance vector V1 between a first landmark point 1011 constituting the eyes and a second landmark point 1012 constituting the mouth.

The device 10 for automatic facial impression transformation may determine Q distance vectors V1, V2, . . . Vq related to the arrangement of face elements as the first distance vector 1020.

Figure 18:
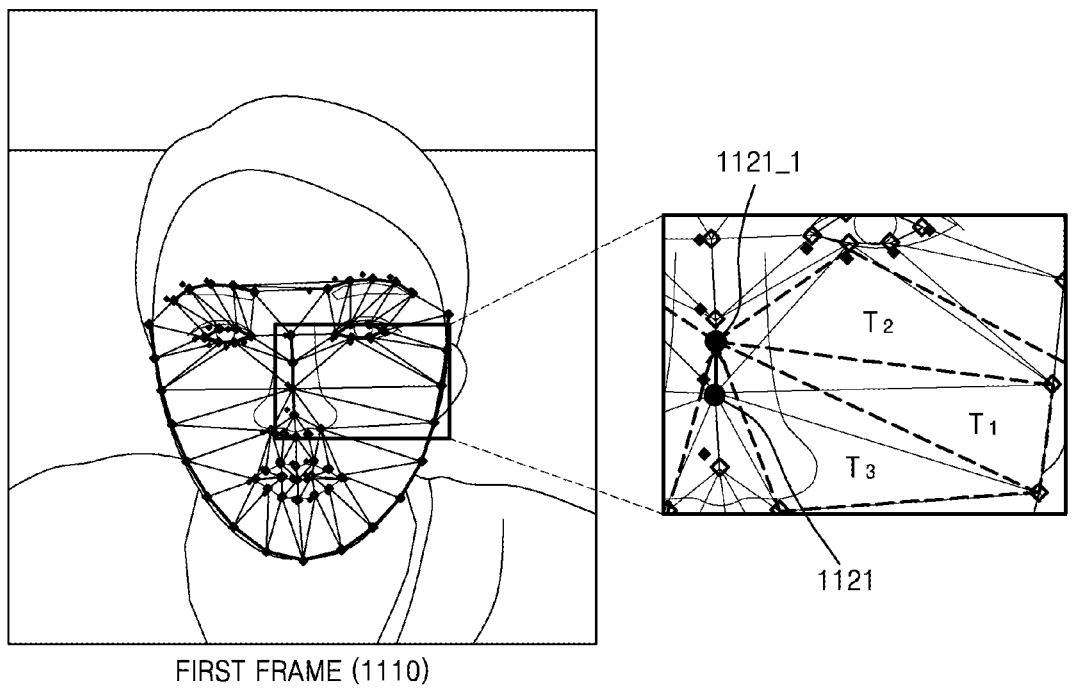
FIG. 18 is a diagram showing an example in which a device for automatic facial impression transformation divides a facial image into a plurality of triangles.

FIG. 18 is a diagram showing an example in which the device for automatic facial impression transformation divides a facial image into a plurality of triangles.

Referring to FIG. 18, the device 10 for automatic facial impression transformation may divide a facial image in a first frame 1110 into a plurality of triangular meshes having first landmark points as vertices. When the landmark point 1121 is moved according to at least one of the first distance vector and the second distance vector, the device 10 for automatic facial impression transformation may extract an image corresponding to the triangular meshes T1, T2, and T3 having the moved landmark point 1121-1 as the vertices. In addition, the device 10 for automatic facial impression transformation may warp the extracted image (that is, transform the extracted image in the form represented by dashed lines in FIG. 11) and output the warped image.

Figure 19:
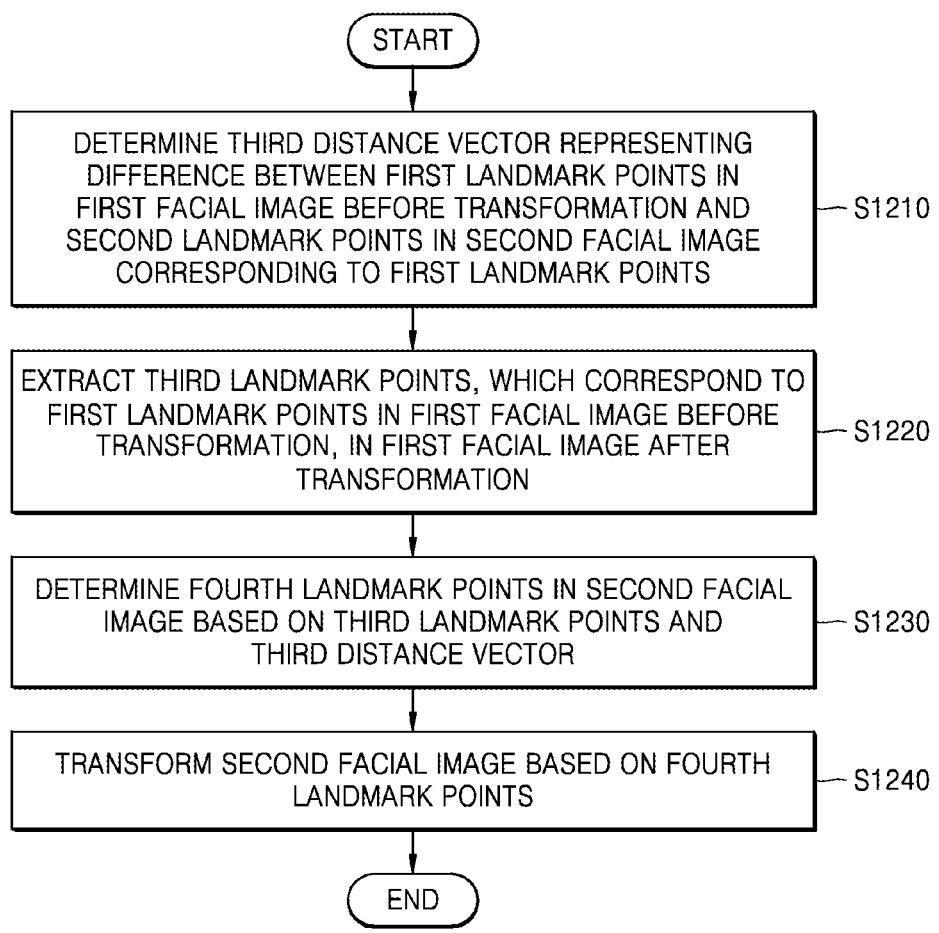
FIG. 19 is a diagram showing a method by which a device for automatic facial impression transformation transforms a facial image in a second frame.

FIG. 19 is a diagram showing a method by which the device for automatic facial impression transformation transforms a facial image in a second frame.

Referring to FIG. 19, in operation S1210, the device 10 for automatic facial impression transformation may determine a third distance vector representing a difference between the first landmark points in the first facial image before transformation and the second landmark points in the second facial image corresponding to the first landmark points. The device 10 for automatic facial impression transformation may extract the second landmark points from the second facial image and determine the third distance vector by comparing the first landmark points with the second landmark points.

Specifically, the device 10 for automatic facial impression transformation may track the change from the first frame before transformation to the second frame and extract the second landmark points in the second facial image corresponding to the first landmark points in the first facial image before transformation.

Alternatively, the device 10 for automatic facial impression transformation may identify the second facial image in the second frame and extract the second landmark points corresponding to the first landmark points from the identified second facial image. For example, the device 10 for automatic facial impression transformation may identify the second facial image from a predetermined region in the second frame corresponding to the region in which the first facial image in the first frame is identified. Alternatively, the device 10 for automatic facial impression transformation may analyze a color distribution or the like in the second frame, identify the second facial image, and extract the second landmark points from the identified second facial image.

The device 10 for automatic facial impression transformation may determine a third distance vector based on a difference between coordinate values of the second landmark points extracted from the second facial image and coordinate values of the first landmark points extracted from the first facial image before transformation.

In operation S1220, the device 10 for automatic facial impression transformation may extract third landmark points, which correspond to the first landmark points in the first facial image before transformation, in the first facial image after transformation. That is, when the first facial image in the first frame is transformed, the third landmark points may represent the locations of the first landmark points moved based on at least one of the first distance vector and the second distance vector.

In operation S1230, the device 10 for automatic facial impression transformation may determine fourth landmark points in the second facial image based on the third landmark points and the third distance vector. When the second image is transformed, the fourth landmark points may represent the locations to which the second landmark points in the second facial image before transformation are to be moved.

The device 10 for automatic facial impression transformation may transform the third landmark points according to the third distance vector and calculate the fourth landmark points in the second facial image used to transform the second facial image.

In operation S1240, the device 10 for automatic facial impression transformation may transform the second facial image based on the fourth landmark points. The device 10 for automatic facial impression transformation may transform the second facial image by moving the locations of the second landmark points in the second facial image to the locations of the fourth landmark points.

Specifically, the device 10 for automatic facial impression transformation may divide the second facial image before transformation into a plurality of triangles and store information about the triangles and the second facial image in the graphic processor memory (for example, the texture memory or the like). For example, the device 10 for automatic facial impression transformation may identify triangular meshes having the second landmark points as vertices by using a Delaunay triangulation method and store information about the triangular meshes in the graphic processor memory.

In addition, the device 10 for automatic facial impression transformation may transform the triangular meshes stored in the graphic processor memory by moving the locations of the second landmark points to the locations of the fourth landmark points. For example, the device 10 for automatic facial impression transformation may read the image corresponding to each triangular mesh from the graphic processor memory and warp (for example twist, extend, or the like) the read image based on the locations of the moved landmark points.

According to an embodiment, the device 10 for automatic facial impression transformation may output the second frame including the transformed second facial image. Alternatively, the device 10 for automatic facial impression transformation may transmit the second frame to another device for automatic facial impression transformation.

Figure 20:
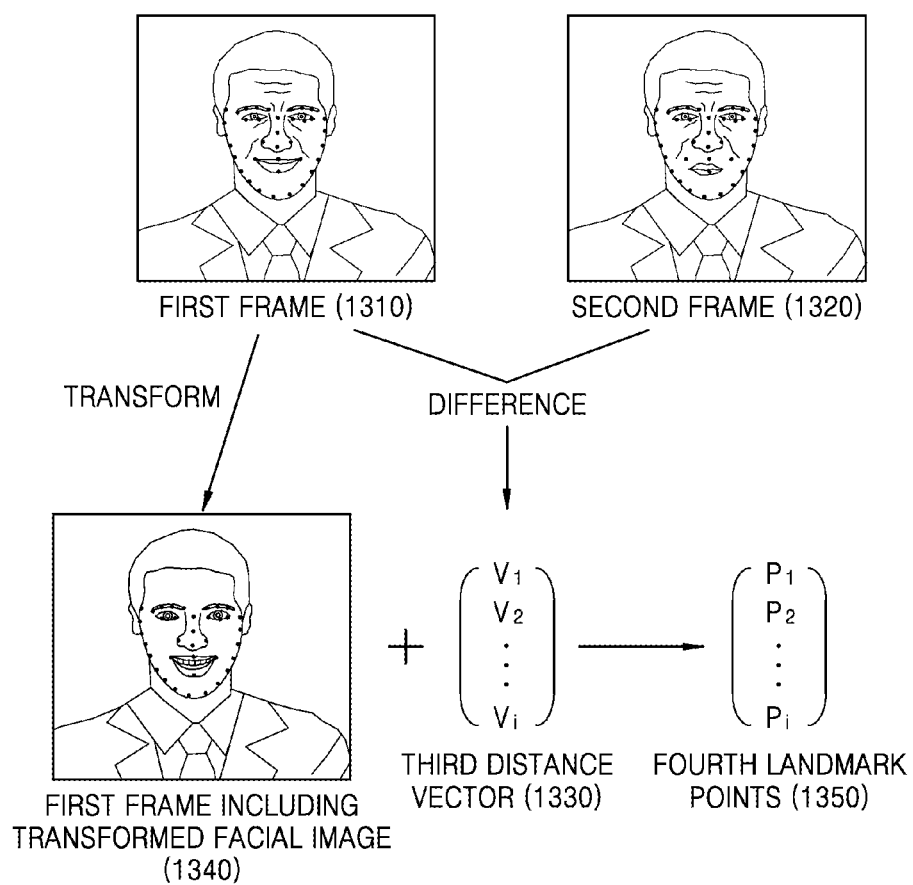
FIG. 20 is a diagram showing an example in which a device for automatic facial impression transformation determines a fourth landmark point.

FIG. 20 is a diagram showing an example in which the device for automatic facial impression transformation determines a fourth landmark point.

Referring to FIG. 20, the device 10 for automatic facial impression transformation may determine a third distance vector 1330 by comparing a difference between first landmark points in a first frame 1310 before transformation and second landmark points in a second frame 1320. When the number of first landmark points in the first frame 131 is I, the device 10 for automatic facial impression transformation may extract I second landmark points corresponding to the first landmark points. In addition, the third distance vector 1330 may include I vectors representing the result of comparing the coordinate values of the first landmark points and the coordinate values of the second landmark points.

In addition, the device 10 for automatic facial impression transformation may determine fourth landmark points 1350 by adding the third distance vector 1330 to the third landmark points in the first frame 1340 including the first facial image after transformation. The fourth landmark points 1350 may be I coordinate values (for example, P1={a, b} or the like) representing a predetermined location in the second frame 1320.

Figure 21:
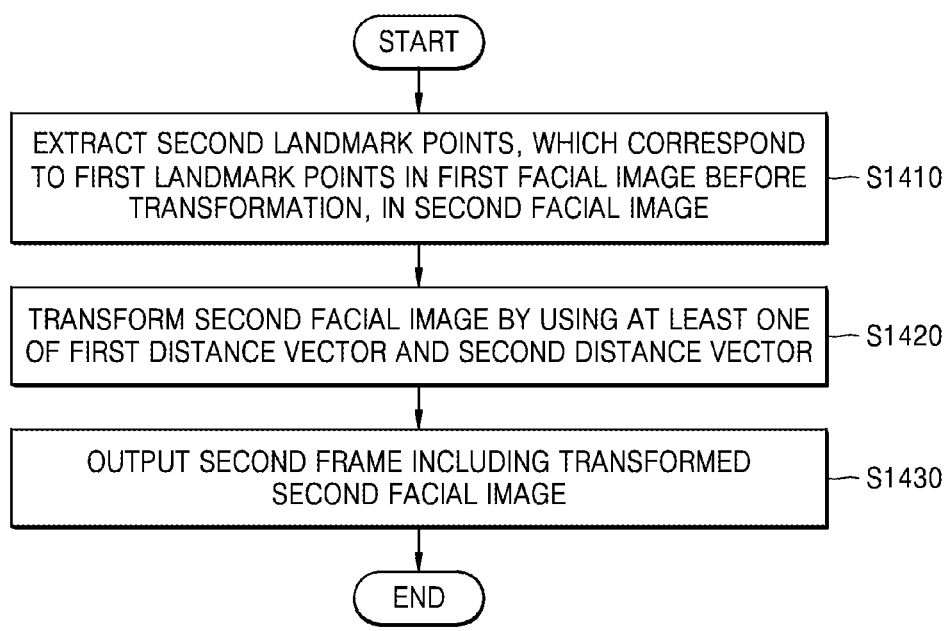
FIG. 21 is a diagram showing a method by which a device for automatic facial impression transformation transforms a second facial image in a second frame, according to another embodiment of the present disclosure.

FIG. 21 is a diagram showing a method by which the device for automatic facial impression transformation transforms a second facial image in a second frame, according to another embodiment.

Referring to FIG. 21, in operation S1410, the device 10 for automatic facial impression transformation may extract second landmark points, which correspond to the first landmark points in the first facial image before transformation, in the second facial image. For example, the device 10 for automatic facial impression transformation may extract the second landmark points by tracking the change in the first frame and the second frame, or may extract the second landmark points corresponding to the first landmark points from the second facial image in the second frame. Since operation S1410 corresponds to operation S1210 of FIG. 19, a detailed description thereof will be omitted.

In operation S1420, the device 10 for automatic facial impression transformation may transform a second facial image by using at least one of the first distance vector and the second distance vector. The device 10 for automatic facial impression transformation may transform the second facial image by moving locations of landmark points constituting the face elements in the second facial image by using at least one of the first distance vector and the second distance vector.

The first distance vector may be determined from the comparison target facial image so as to transform at least one of the sizes and the shapes of the face elements in the first facial image. In addition, the second distance vector may be determined from the comparison target facial image so as to transform the arrangement of the face elements in the first facial image. The device 10 for automatic facial impression transformation may move the locations of the second landmark points in the second facial image according to at least one of the first distance vector and the second distance vector. In addition, the device 10 for automatic facial impression transformation may transform the second facial image based on the moved locations of the second landmark points.

Specifically, the device 10 for automatic facial impression transformation may divide the face elements in the second facial image into the plurality of triangles based on the second landmark points in the second facial image before transformation. In addition, when the locations of the second landmark points are moved according to at least one of the first distance vector and the second distance vector, the device 10 for automatic facial impression transformation may transform the image in the triangles having the moved second landmark points as vertices. In this case, the device 10 for automatic facial impression transformation may perform a pixel interpolation process necessary for high speed image transformation by using the graphic processor memory.

In operation S1430, the device 10 for automatic facial impression transformation may output the second frame including the transformed second facial image. Alternatively, the device 10 for automatic facial impression transformation may transmit the second frame to another device for automatic facial impression transformation, or may store the second frame without outputting the second frame.

Figure 22:
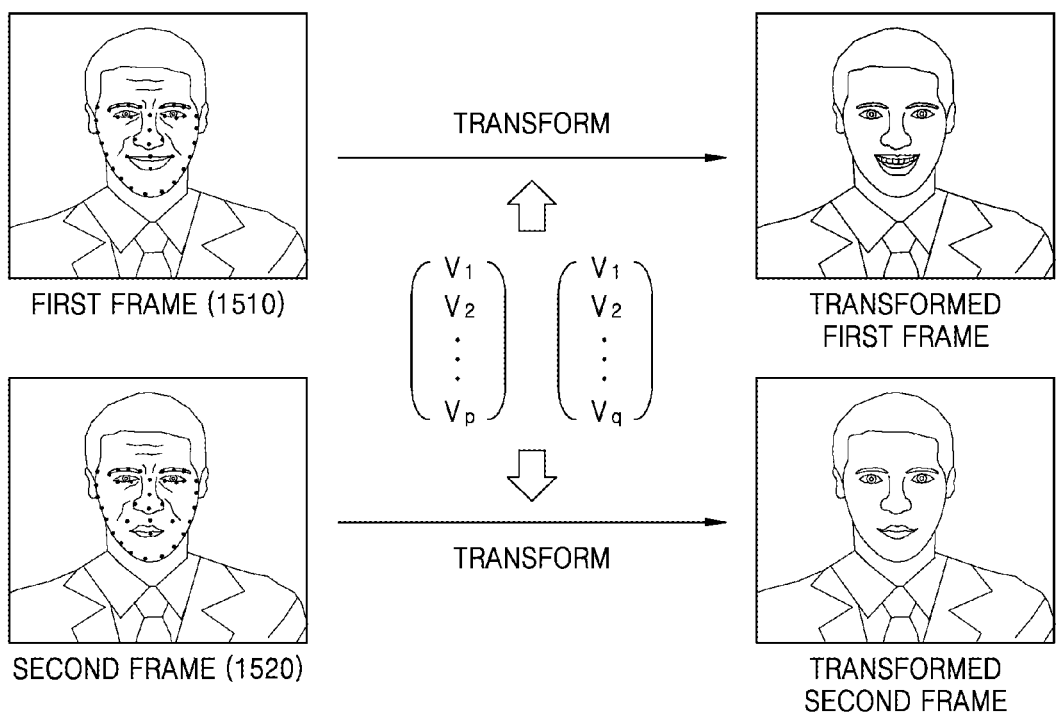
FIG. 22 is a diagram showing an example in which a device for automatic facial impression transformation transforms a second frame based on at least one of a first distance vector and a second distance vector.

FIG. 22 is a diagram showing an example in which the device for automatic facial impression transformation transforms a second frame based on at least one of a first distance vector and a second distance vector.

Referring to FIG. 22, the device 10 for automatic facial impression transformation may transform the first facial image in the first frame 1510 and the second facial image in the second frame 1520 by using the first distance vector 1530 and the second distance vector 1540. The embodiments described with reference to FIGS. 9 and 10 may be applied to the method of determining the first distance vector 1530 and the second distance vector 1540.

As such, the device 10 for automatic facial impression transformation may quickly transform the facial impression of the person in the moving picture by repeatedly applying the first distance vector 1530 and the second distance vector 1540 to M frames of the moving picture.

Figure 23:
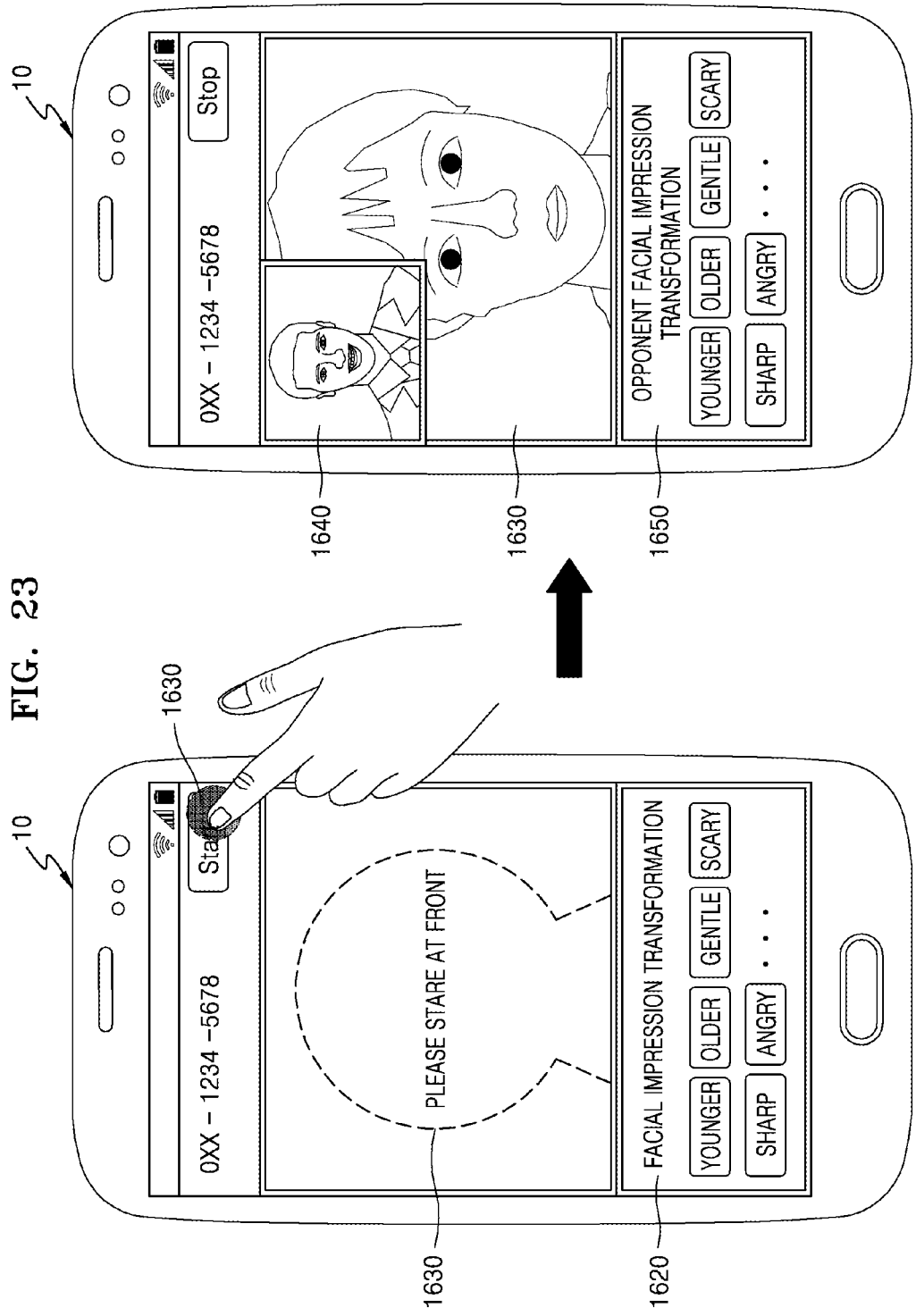
FIG. 23 is a diagram showing an example in which a device for automatic facial impression transformation executes a video chat application and transforms a facial impression of a person who is in a video chat.

FIG. 23 is a diagram showing an example in which the device 10 for automatic facial impression transformation executes a video chat application and transforms a facial impression of a person who is in a video chat.

Referring to FIG. 23, when the video chat application is executed, the device 10 for automatic facial impression transformation may photograph a moving picture to be transmitted to the opponent of the video chat, and transform a facial impression of a person in the photographed moving picture. In this case, the device 10 for automatic facial impression transformation may provide a user interface 1610 of inducing the face location and direction (for example, front) of the user participating in the video chat to a specific region (represented by dashed lines). Therefore, when the video chat is started and a first frame of the moving picture is acquired, the device 10 for automatic facial impression transformation may identify a first facial image from the specific region induced by the user interface 1610 in the first frame. In addition, the device 10 for automatic facial impression transformation may extract first landmark points from the identified first facial image.

In addition, according to an embodiment, the device 10 for automatic facial impression transformation may provide a user interface 1620 of determining a target facial impression type.

When a user interface 1630 of starting the video chat is received, the device 10 for automatic facial impression transformation may transform the facial impression of the user in the moving picture into the target facial impression type and transmit the transformed moving picture to another device for automatic facial impression transformation being in video chat in real time. In addition, the device 10 for automatic facial impression transformation may output the moving picture, in which the facial impression of the user is transformed, to a part 1640 of a screen of the device 10 for automatic facial impression transformation.

Meanwhile, the case where the facial impression of the photographed user is transformed by the device 10 for automatic facial impression transformation has been described in FIG. 23, but embodiments of the present disclosure are not limited thereto. According to an embodiment, the device 10 for automatic facial impression transformation may transform a facial impression of another user participating in the video chat. For example, the device 10 for automatic facial impression transformation may transform and output the facial impression of another user in the moving picture received from another device for automatic facial impression transformation. In this case, the device 10 for automatic facial impression transformation may provide a user interface 1650 of selecting the target facial impression type for transforming the facial impression of another user participating in the video chat.

Figure 24:
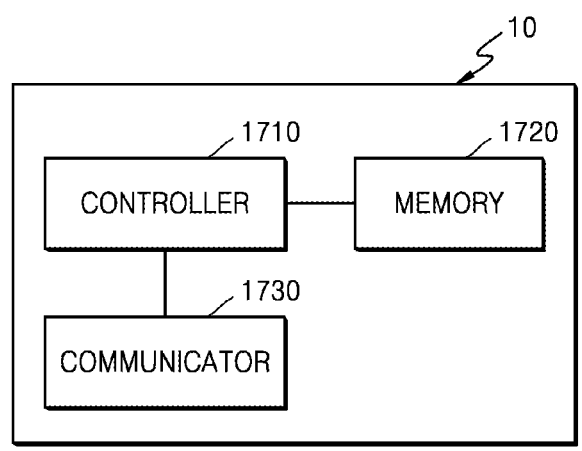
FIG. 24 is a block diagram showing a configuration of a device for automatic facial impression transformation according to an embodiment of the present disclosure.
Figure 25:
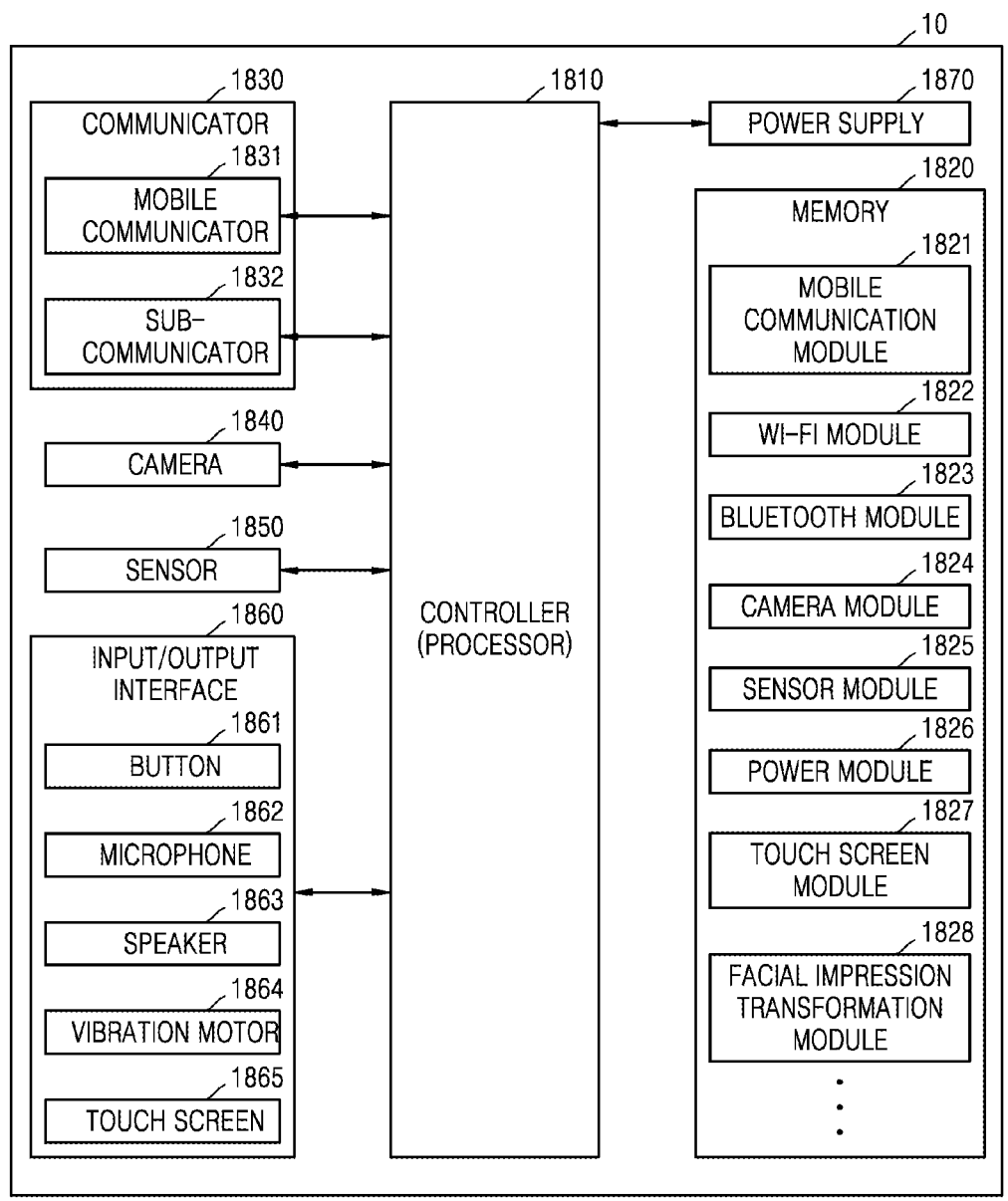
FIG. 25 is a block diagram showing a configuration of a device for automatic facial impression transformation according to another embodiment of the present disclosure.

FIGS. 24 and 25 are diagrams showing a configuration of a device 10 for automatic facial impression transformation according to an embodiment. The elements of the device 10 for automatic facial impression transformation illustrated in FIGS. 24 and 25 are related to the embodiments described with reference to FIGS. 1 to 23. Therefore, even though omitted below, the descriptions provided with reference to FIG. 1 or 23 may be applied to the configuration of the device 10 for automatic facial impression transformation illustrated in FIGS. 24 and 25.

FIG. 24 is a diagram showing the configuration of the device for automatic facial impression transformation according to an embodiment. Referring to FIG. 24, the device 10 for automatic facial impression transformation may include a controller 1710, a memory 1720, and a communicator 1730.

The controller 1710 may control the overall operation of the device 10 for automatic facial impression transformation. For example, the controller 1710 may control the memory 1720 and the communicator 1730 to transform a facial impression of a person in a moving picture.

Specifically, the controller 1710 identifies face elements based on first landmark points extracted from a first facial image in a first frame of the moving picture. In this case, the moving picture may be a moving picture stored in the memory 1720, or may be a moving picture received from the outside through the communicator 1730. Alternatively, the controller 1710 may continuously receive frames of a moving picture photographed through a camera (not shown).

For example, the controller 1710 may acquire a first frame of the moving picture and identify a first facial image for the first frame. In addition, the controller 1710 may extract first landmark points from the identified first facial image. In addition, the controller 1710 may identify face elements based on the locations of the extracted first landmark points.

In addition, the controller 1710 determines a first distance vector used for transforming a location of at least one of landmark points constituting the face elements in the first facial image, so as to transform at least one of sizes and shapes of the face elements in the first facial image. The controller 1710 may extract a comparison target facial image similar to the first facial image in the first frame and matching the target facial impression type and determine, as a first distance vector, a distance vector between landmark features constituting the sizes and shapes of face elements of the comparison target facial image. For example, the first distance vector may be a vector connecting two arbitrary landmark points constituting one face element in the comparison target facial image.

Specifically, the controller 1710 may acquire N comparison target facial images having a similarity of a predetermined value or more with respect to the first facial image in the first frame. In addition, the controller 1710 may select at least one comparison target facial image corresponding to the target facial impression type among the N comparison target facial images. Alternatively, the controller 1710 may select one comparison target facial image that is most suitable for the target facial impression type among the N comparison target facial images, based on the correlation function (730 in FIG. 14) with respect to the vector value between landmark points constituting the face elements and the facial impression type.

Meanwhile, the comparison target facial image may be provided from a server (for example, a cloud server, a web server, a database, or the like) storing information about a plurality of comparison target facial images through the communicator 1730. Alternatively, the comparison target facial image may be provided from the memory 1720.

In addition, the controller 1710 may determine a second distance vector used for transforming a location of at least one of landmark points in the first facial image, so as to transform the arrangement of the face elements in the first facial image. The controller 1710 may determine, as a second distance vector, a distance vector between landmark points constituting the arrangement between the face elements of the comparison target facial image among landmark points in the comparison target facial image. For example, the second distance vector may represent a distance and a direction between two arbitrary landmark points constituting different face elements in the comparison target facial image. Meanwhile, the controller 1710 may selectively perform an operation of determining the second distance vector based on an amount of a processing load or the like of the device 10 for automatic facial impression transformation.

The controller 1710 may transform the first facial image according to at least one of the first distance vector and the second distance vector. The controller 1710 may transform the first facial image by moving locations of landmark points constituting the face elements in the first facial image by using at least one of the first distance vector and the second distance vector.

Specifically, the controller 1710 may divide the face elements in the first facial image into a plurality of triangles and store information about the plurality of triangles in the memory together with the first facial image. In addition, the controller 1710 may move locations of landmark points in the first facial image so that the landmark points constituting the sizes and shapes of the face elements in the first facial image correspond to the first distance vector. In addition, the controller 1710 may move locations of landmark points in the first facial image so that the landmark points constituting the arrangement of the face elements in the first facial image correspond to the second distance vector. When the locations of the landmark points in the first facial image are moved, the controller 1710 may transform the images within the triangles based on the moved locations of the landmark points. In this case, the controller 1710 may extract the images corresponding to the triangles from the memory and correct the image within the triangles while transforming the vertices of the triangles based on the moved locations.

For example, the controller 1710 may store the information about the plurality of triangles and the first facial image in a graphic processor memory (not shown) and warp (for example, twist, extend, or the like) the images corresponding to the triangles according to the transformation of the vertices of the triangles. Meanwhile, when the controller 1710 does not include a graphic processing unit (GPU), the controller 1710 may provide a control signal to the GPU so as to control the GPU to warp the images corresponding to the triangles.

According to an embodiment, the controller 1710 extracts a second frame adjacent to the first frame from the moving picture. For example, the controller 1710 may extract the second frame adjacent to the first frame from the moving picture stored in the memory 1720, or may extract the second frame from the moving picture received through the communicator 1730. Alternatively, the controller 1710 may receive the second frame after the first frame through a camera (not shown).

According to an embodiment, the controller 1710 transforms the second facial image in the second frame based on a difference between the first facial face in the first frame and the second facial image in the second frame. The controller 1710 may predict locations of landmark points in the second facial image after transformation by using the difference between the first facial image before transformation and the second facial image. In addition, the controller 1710 may transform the second facial image by using the predicted locations of the landmark points.

Specifically, the controller may determine a third distance vector representing a difference between the first landmark points in the first facial image before transformation and the second landmark points extracted from the second facial image. For example, the controller 1710 may track the change in the first frame and the second frame and extract the second landmark points corresponding to the first landmark points in the first facial image before transformation.

In addition, the controller 1710 may extract third landmark points, which correspond to the first landmark points in the first facial image before transformation, in the first facial image after transformation. In addition, when the second facial image is transformed, the controller 1710 may determine fourth landmark points to which the second landmark points in the second facial image before transformation are to be moved. In this case, the fourth landmark points may be determined based on the third distance vector and the third landmark points.

The controller 1710 may divide the face elements in the second facial image into a plurality of triangles by using the second landmark points and store information about the plurality of triangles in the inside of the controller 1710 or the memory (for example, the graphic processor memory) disposed outside the controller 1710 together with the second facial image. By moving the locations of the second landmark points to the locations of the fourth landmark points, the controller 1710 may transform (for example, warp) the images within the triangles having the moved landmark points as vertices.

The memory 1720 may store the moving picture acquired by the device 10 for automatic facial impression transformation and the moving picture in which the facial impression of the person has been transformed. In addition, the memory 1720 may store information for transforming the facial impression of the person in the moving picture. For example, the memory 1720 may store information about a plurality of facial impression types, information about a distance between landmark points constituting face elements for each facial impression type, information about the comparison target facial image, and the like.

The communicator 1730 may include at least one device configured to communicate with an external device (not shown) and an external server (not shown).

FIG. 25 is a diagram showing a configuration of a device for automatic facial impression transformation according to an embodiment. The device 10 for automatic facial impression transformation may be a mobile device as illustrated in FIG. 23.

A communicator 1830 may include a mobile communicator 1831 and a sub-communicator 1832. The mobile communicator 1831 performs a call setup, data communication, or the like with a base station through a cellular network. The sub-communicator 1832 may perform a function for wireless communication, such as Bluetooth or near field communication (NFC).

A camera 1840 includes a lens or optical elements for photographing a moving picture.

A sensor 1850 may include a gravity sensor configured to sense the movement of the device 10 for automatic facial impression transformation, an illumination sensor configured to sense brightness of light, a proximity sensor configured to sense proximity of a person, a motion sensor configured to sense the movement of a person, and the like.

An input/output interface 1860 provides an interface with an external device or a person and includes a button 1861, a microphone 1862, a speaker 1863, a vibration motor 1864, and a touch screen 1865. A touch screen 1865 is connected to a display (not shown) and outputs information processed by the controller 1810 and receives a user touch input.

According to an embodiment, the touch screen 1865 may provide a user interface of selecting a target facial impression type among a plurality of facial impression types. For example, the touch screen 1865 may output a facial impression type list and receive a user input of selecting one of the facial impression type list. Alternatively, the controller 1810 may generate preview images by transforming a facial impression of a person in at least one frame, which is received from the camera 1840 before the photographing of the moving picture is started, into a plurality of facial impression types, and the touch screen 1865 may output the preview images received from the controller 1810. In this case, the touch screen 1865 may receive a user input of selecting one of the preview images.

A power supply 1870 is connected to a battery or an external power source so as to supply power necessary for the device 10 for automatic facial impression transformation.

The controller 1810 may include a random access memory (RAM) (not shown) configured to store a signal or data input from the outside or used as storage regions corresponding to various operations performed by the device 10 for automatic facial impression transformation, a read-only memory (ROM) (not shown) configured to store a control program for controlling the device 10 for automatic facial impression transformation, and at least one processor (not shown).

The controller 1810 may be implemented with a system on chip (SoC) including a graphic processing unit (not shown) configured to perform image processing and at least one core (not shown). In addition, the controller 1810 may further include a graphic processor memory configured to store information processed by the graphic processing unit. According to an embodiment, the term "controller" may be construed as the same meaning as the term "processor".

The controller 1810 may transform the facial image of the person in the moving picture by executing programs stored in the memory 1820.

The programs stored in the memory 1820 may be classified into a plurality of modules according to functions thereof. For example, the programs may be classified into a mobile communication module 1821, a Wi-Fi module 1822, a Bluetooth module 1823, a camera module 1824, a sensor module 1825, a power module 1826, a touch screen module 1827, a facial impression transformation module 1828, and the like.

Since the functions of the respective modules may be intuitively inferred from the names thereof by those of ordinary skill in the art, only the facial impression transformation module 1828 will be described. The facial impression transformation module 1828 may include a program configured to identify face elements based on first landmark points extracted from a first facial image in a first frame of a moving picture.

In addition, the facial impression transformation module 1828 may include a program configured to determine a first distance vector used for transforming a location of at least one of landmark points constituting the face elements, so as to transform at least one of sizes and shapes of the face elements. Specifically, the facial impression transformation module 1828 may include a program configured to extract a comparison target facial image similar to a first facial image in a first frame and matching a target facial impression type and determine, as a first distance vector, a distance vector between landmark features constituting sizes and shapes of face elements of the comparison target facial image. The comparison target facial image may correspond to a target facial impression type among N comparison target facial images having a similarity of a predetermined value or more with respect to the first facial image in the first frame.

In addition, the facial impression transformation module 1828 may include a program configured to determine a second distance vector used for transforming a location of at least one of first landmark points, so as to transform the arrangement between face elements of the first facial image. For example, the facial impression transformation module 1828 may include a program configured to determine, as a second distance vector, a distance vector between landmark points constituting the arrangement between the face elements of the comparison target facial image among landmark points in the comparison target facial image.

In addition, the facial impression transformation module 1828 may include a program configured to transform the first facial image according to at least one of the first distance vector and the second distance vector. The facial impression transformation module 1828 may include a program configured to transform the first facial image by moving locations of landmark points constituting the face elements in the first facial image by using at least one of the first distance vector and the second distance vector.

In addition, the facial impression transformation module 1828 may include a program configured to output the first frame including the transformed first facial image through the touch screen 1865, or transmit the first frame to an external device through the communicator 1830.

In addition, the facial impression transformation module 1828 may include a program configured to extract a second frame adjacent to the first frame from the moving picture.

In addition, the facial impression transformation module 1828 may include a program configured to transform the second facial image in the second frame based on a difference between the first facial face in the first frame and the second facial image in the second frame. The facial impression transformation module 1828 may include a program configured to predict locations of landmark points in the second facial image after transformation by using the difference between the first facial image before transformation and the second facial image. In addition, the controller 1710 may include a program configured to transform the second facial image by using the predicted locations of the landmark points.

Embodiments of the present disclosure may be embodied in a recording medium including instruction codes executable by a computer, such as a program module executed by the computer. A non-transitory computer-readable medium may be any available medium which is accessible by a computer and may include any volatile and non-volatile media and any removable and non-removable media. Furthermore, the non-transitory computer-readable medium may include any computer storage medium and communication medium. The computer storage medium may include any volatile or non-volatile medium and any removable or non-removable medium embodied by a certain method or technology for storing information such as a computer-readable instruction code, a data structure, a program module, or other data. The communication medium may include a computer-readable instruction code, a data structure, a program module, other data of modulated data signals such as a carrier, or other transmission mechanisms, and may include any information transmission medium.

In an existing mobile market, users of mobile videos and video calls are greatly increasing due to the propagation of LTE. In addition, as it is expected that smart TV is widely supplied, video conferences and remote meetings using large TV will be more demanded, and visual communications will be also more demanded along with the appearance of smart phones. In addition, as various communications for video calls such as Skype and Hangout appear, real-time facial impression transformation is demanded, and thus the present disclosure is expected to have a ripple effect.

Moreover, the present disclosure is expected to be actively utilized in an emotional image processing technique (a facial impression transformation technique in an image) for image making in social media. In addition, since the present disclosure may be easily associated with various realistic contents and social media services, the present disclosure is expected to be utilized for various image-based or video-based applications such as cosmetic surgery, moving pictures, mobile communications or the like. Further, the present disclosure is expected to be applicable to various real-time moving picture processing techniques (facial impression transformation) in a mobile video market.

The present disclosure is directed to a method for automatic facial impression transformation based on a moving picture, and when a facial impression is transformed, a learning data set is configured suitable for a facial shape of an input target face to generate an estimation function of the corresponding facial impression, so that face components (shape and location) are transformed to have a high resultant value of the function, thereby transforming the facial image into a facial impression desired by the user. Therefore, the transformation efficiency may be maximized.

In addition, the transformation process is performed at two stages, namely a local transformation for determining size and shape of local elements (eyes, eyebrows, nose and mouth) of the face and a global transformation for determining locations of local elements of the face, thereby enhancing the accuracy. Further, it is possible to detect a facial landmark point in real time and consider a movement of an object, which allows application to a moving picture.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A method for automatic facial impression transformation, comprising:
    extracting landmark points for elements of a target face whose facial impression is to be transformed as well as distance vectors respectively representing distances of the landmark points;
    acquiring, from a database, a learning data set associated with a facial shape similar to the target face based on the distance vectors;
    extracting landmark points and distance vectors from the learning data set;
    determining a first distance vector of the target face used for transforming a local feature of the target face based on distance vectors between landmark points determining sizes and shapes of face elements of the learning data set, and determining a second distance vector of the target face used for transforming a global feature of the target face based on distance vectors between landmark points determining arrangement of the face elements of the learning data set; and transforming the facial impression of the target face based on at least one of the first distance vector and the second distance vector,
wherein the learning data set used is the same for the transforming of the local feature of the target face and the transforming of the global feature of the target face.

2. The method of claim 1, wherein the transforming of the facial impression of the target face comprises:
generating a target function based on the landmark points of the learning data set and score data of a facial impression; and
determining shapes and sizes of the elements of the target face by moving landmark points associated with the first distance vector, based on the target function.

3. The method of claim 1, wherein the, transforming of the facial impression of the target face comprises:
generating a target function based on the distance vectors of the learning data set and score data of a facial impression; and
determining locations and angles of the elements of the target face by moving landmark points associated with the second distance vector, based on the target function.

4. The method of claim 1, further comprising receiving a user input of selecting a target facial impression type among a plurality of facial impression types,
wherein the acquiring of the learning data set from the database comprises acquiring a learning data set associated with the target facial impression type.

5. The method of claim 1, further comprising continuously outputting frames of the moving picture including the target face whose facial impression is transformed.

6. The method of claim 1, further comprising acquiring a target face whose facial impression is to be transformed from a frame of a moving picture.

7. The method of claim 6, wherein the target face is an expressionless photograph staring at front.

8. The method of claim 1, further comprising forming a database storing learning data.

9. The method of claim 8, wherein the forming of the database storing the learning data comprises:
acquiring expressionless front facial images; and
extracting landmark points and distance vectors from the expressionless front facial images.

10. The method of claim 8, wherein the forming of the database storing the learning data comprises collecting and accumulating score data for facial impressions.

11. A non-transitory computer-readable recording medium, on which a computer program for executing the method for automatic facial impression transformation according to claim 1 is recorded.

12. A device for automatic facial impression transformation, comprising:
a facial feature extracting unit configured to extract landmark points for elements of a target face whose facial impression is to be transformed, included in a frame of a moving picture, as well as distance vectors respectively representing distances of the landmark points; and
a facial impression transforming unit configured to acquire, from a database, a learning data set associated with a facial shape most similar to the target face based on the distance vectors, extract landmark points and distance vectors from the learning data set, and transform the facial impression of the target face based on the extracted landmark points and distance vectors of the learning data set,
wherein the facial impression transforming unit comprises:
a local feature transforming unit configured to determine a first distance vector of the target face used for transforming a local feature of the target face, based on distance vectors between landmark points determining sizes and shapes of face elements of the learning data set; and
a global feature transforming unit configured to determine a second distance vector of the target face used for transforming a global feature of the target face, based on distance vectors between landmark points determining arrangement of face elements of the learning data set, and
the facial impression of the target face is transformed based on at least one of the first distance vector and the second distance vector,
wherein the learning data set used is the same for the transforming of the local feature of the target face and the transforming of the global feature of the target face.

* * * * *